US012677258B2

(12) United States Patent (10) Patent No.: US 12,677,258 B2

Xing et al. (45) Date of Patent: Jul. 7, 2026

(54) RESOURCE ATTRIBUTE CONFIGURING METHOD, RESOURCE ATTRIBUTE DETERMINING METHOD, COMMUNICATION NODE AND STORAGE MEDIUM FOR IMPROVING RESOURCE UTILIZATION RATE OF IAB LINK

(71) Applicant: ZTE CORPORATION, Shenzhen (CN)

(72) Inventors: Weimin Xing, Shenzhen (CN); Ting Miao, Shenzhen (CN); Youxiong Lu, Shenzhen (CN); Feng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 419 days.

(21) Appl. No.: 18/550,563

(22) PCT Filed: Mar. 3, 2022

(86) PCT No.: PCT/CN2022/079066

§ 371 (c)(1),
(2) Date: Sep. 14, 2023

(87) PCT Pub. No.: WO2022/206277

PCT Pub. Date: Oct. 6, 2022

(65) Prior Publication Data

US 2024/0298301 A1 Sep. 5, 2024

(30) Foreign Application Priority Data

Apr. 1, 2021 (CN) .......................... 202110358323.8

(51) Int. Cl.
*H04W 72/044* (2023.01)

(52) U.S. Cl.
CPC .................................. *H04W 72/044* (2013.01)

(58) Field of Classification Search
CPC .. H04L 5/0005; H04L 5/0023; H04W 72/044; H04W 72/0453; H04W 72/0446;
(Continued)

(56) References Cited

U.S. PATENT DOCUMENTS

| | | | |
|---|---|---|---|
| 2021/0367660 A1* | 11/2021 | Jo .......................... | H04L 5/0092 |
| 2022/0286196 A1* | 9/2022 | Luo .................... | H04B 7/15542 |

(Continued)

FOREIGN PATENT DOCUMENTS

| | | |
|---|---|---|
| CN | 111757486 A | 10/2020 |
| CN | 111901871 A | 11/2020 |

(Continued)

OTHER PUBLICATIONS

Extended European Search Report for corresponding Application No. 22778461.8, dated Mar. 4, 2025, 11 pages.
3GPP TSG-RAN WG1 Meeting #104-e, "Resource multiplexing and DC in enhanced IAB". R1-2101695, eMeeting, Jan. 25-Feb. 5, 2021, 14 pages.
(Continued)

*Primary Examiner* — Allahyar Kasraian
(74) *Attorney, Agent, or Firm* — Dority & Manning, P.A.

(57) ABSTRACT

A resource attribute configuring method, comprising: configuring at least one frequency domain resource attribute mode; and transmitting configuration information of the at least one frequency domain resource attribute mode, wherein the configuration information is used to indicate a frequency domain resource attribute of a target time domain resource, and the frequency domain resource attribute of the target time domain resource meet one of the at least one frequency domain resource attribute mode.

20 Claims, 2 Drawing Sheets

Configure at least one frequency domain resource attribute mode ⟋110

Transmit configuration information of the at least one frequency domain resource attribute mode, where the configuration information is used to indicate a frequency domain resource attribute of a target time domain resource, and the frequency domain resource attribute of the target time domain resource meets one of the at least one frequency domain resource attribute mode ⟋120

(58) Field of Classification Search
CPC .. H04W 72/04; H04W 72/1263; H04W 16/02
See application file for complete search history.

(56) References Cited

U.S. PATENT DOCUMENTS

| | | | | |
|---|---|---|---|---|
| 2022/0322299 | A1* | 10/2022 | Luo ........................ | H04W 72/23 |
| 2023/0164793 | A1* | 5/2023 | Ghanbarinejad ..... | H04L 5/0053 |
| | | | | 370/329 |
| 2023/0188252 | A1* | 6/2023 | Peng .................... | H04W 72/27 |
| | | | | 370/329 |
| 2023/0199740 | A1* | 6/2023 | Li .......................... | H04L 5/001 |
| | | | | 370/329 |

FOREIGN PATENT DOCUMENTS

| | | | |
|---|---|---|---|
| WO | WO2020092833 | A1 | 5/2020 |
| WO | WO2020143792 | A1 | 7/2020 |
| WO | WO2020202190 | A1 | 10/2020 |

OTHER PUBLICATIONS

PCT International Search Report and Written Opinion (w/ English translation) for corresponding PCT Application No. PCT/CN2022/079066, mailed on May 5, 2022, 14 pages.

$3^{rd}$ Generation Partnership Project, Technical Specification Group Radio Access Network; NR; Physical layer procedures for control (Release 16), 3GPP TS 38.213 V16.4.0, Dec. 2020, 181 pages.

$3^{rd}$ Generation Partnership Project, "RAN1 Chair's Notes", 3GPP TSG RAN WG1 Meeting #104b-e e-Meeting, Apr. 12-20, 2021, 128 pages.

$3^{rd}$ Generation Partnership Project, Technical Specification Group Radio Access Network; NG-RAN; F1 application protocol (F1AP) (Release 16); 3GPP TS 38.473 V16.4.0, Jan. 2021, 461 pages.

Nokia et al., "Maintenance of Rel-16 IAB Resource Multiplexing", 3GPP TSG RAN WG1 Meeting #100, R1-2000797, Feb. 24-Mar. 6, 2020, e-Meeting, 8 pages.

Samsung, "Resource Multiplexing between Backhaul and Access Links", 3GPP TSG RAN WG1 #97, R1-1906932, May 13-17, 2019, Reno, NV, 5 pages.

* cited by examiner

RESOURCE ATTRIBUTE CONFIGURING METHOD, RESOURCE ATTRIBUTE DETERMINING METHOD, COMMUNICATION NODE AND STORAGE MEDIUM FOR IMPROVING RESOURCE UTILIZATION RATE OF IAB LINK

CROSS-REFERENCE TO RELATED APPLICATION(S)

This application is a national phase entry under 35 USC 371 of International Patent Application No. PCT/CN2022/079066 filed on Mar. 3, 2022, the International Patent Application is filed based on Chinese Patent Application with the application No. 202110358323.8, filed on Apr. 1, 2021, and claims priority to the Chinese Patent Application, the entire contents of the International Patent Application and the Chinese Patent Application are incorporated herein by reference.

TECHNICAL FIELD

The present disclosure relates to a wireless communication network, and for example, to a resource attribute configuring method, a resource attribute determining method, a communication node and a storage medium.

BACKGROUND

An integrated access and backhaul (IAB) node includes two types of logical entities, where one type of logical entity is a mobile terminal (MT), which implements backhaul by being connected with its upper level IAB node (i.e., parent node) by wireless; and the other type of logical entity is a distributed unit (DU), which provides services to its lower level IAB node or subordinate user equipment (UE) as a similar base station. An MT and a DU of an IAB node only support time division multiplexing (TDM) on a carrier or cell (Carrier/Cell), and do not support frequency division multiplexing (FDM), thus the multiplexing mode is not flexible, and further, the resource utilization rate is low.

SUMMARY

The present disclosure provides a resource attribute configuring method, a resource attribute determining method, a communication node and a storage medium, so as to improve the resource utilization rate of an IAB link.

Embodiments of the present disclosure provide a resource attribute configuring method, including:
configuring at least one frequency domain resource attribute mode; and transmitting configuration information of the at least one frequency domain resource attribute mode, where the configuration information is used to indicate a frequency domain resource attribute of a target time domain resource, and the frequency domain resource attribute of the target time domain resource meets one of the at least one frequency domain resource attribute mode.

The embodiments of the present disclosure provide a resource attribute determining method, including:
receiving configuration information of at least one frequency domain resource attribute mode; and determining a frequency domain resource attribute of a target time domain resource according to the configuration information, where the target time domain resource corresponds to at least one frequency domain resource, and the frequency domain resource attribute of the target time domain resource meets one of the at least one frequency domain resource attribute mode.

The embodiments of the present disclosure also provide a communication node, including a memory, a processor, and a computer program stored on the memory and runnable on the processor, when the processor executes the program, the above resource attribute configuring method or resource attribute determining method is implemented.

The embodiments of the present disclosure also provide a computer readable storage medium with a computer program stored thereon, the program, upon being executed by a processor, implements the above resource attribute configuring method or resource attribute determining method.

DETAILED DESCRIPTION

Figure 1:
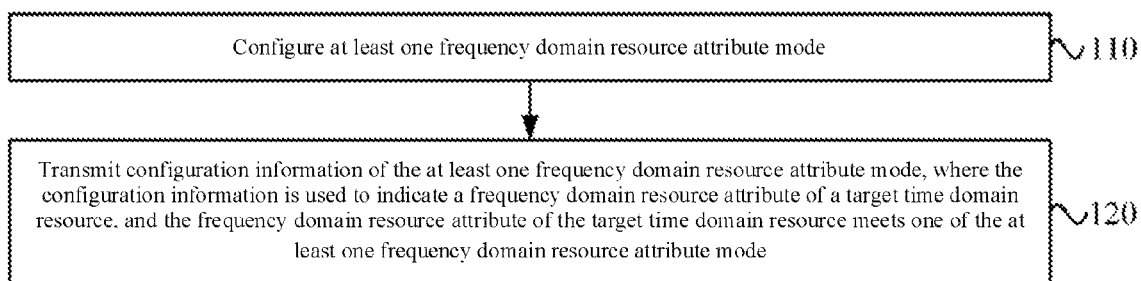
FIG. 1 is a flow chart of a resource attribute configuring method provided by an embodiment.

The present disclosure is described below in combination with the drawings and embodiments. The specific embodiments described herein are only used to explain the present disclosure. For the convenience of description, only parts related to the present disclosure are shown in the drawings.

In a wireless communication network, a cell generally contains at least one carrier, a carrier contains a plurality of subcarriers in the frequency domain, the subcarrier is generally a smallest unit of the frequency domain, a width of a subcarrier in the frequency domain is called as a subcarrier spacing (SCS), a group of subcarriers (generally 12 subcarriers) in frequency domain may be called as a resource block (RB), and a group of RBs (which may be continuous or discrete) is called as an RB group or an RB set.

A central unit (CU) may control or configure various levels of DUs, interfaces between the CU and the various levels of DUs are called F1 interfaces, and the CU may configure the following information for time domain resources of each cell or carrier of the DUs by the F1 interfaces:
a time domain resource type represents whether a time domain symbol is used for downlink (DL) transmission, uplink (UL) reception, or flexible (Flexible, F) selection of both, and the time domain resource type may also be called a DUF type, a time domain resource direction attribute, a symbol direction or a symbol type, etc.; a time domain resource attribute, including hard (H), soft (S), and not available (NA), represents whether the DU may use a time domain symbol or a slot of a cell or a carrier. If a time domain resource attribute of a symbol or a slot is H, it represents that the DU may use the symbol or the slot; if a time domain resource attribute of a symbol or a slot is S, it represents that the DU may use the symbol or the slot in the case where a condition is met, where the condition herein may be that a parent node (Parent IAB) explicitly indicates that the DU can use the symbol or the slot by signaling, or the DU itself implicitly determines that the symbol or the slot can be used (for example, can be used in a case where the parent node does not use the symbol or the slot); if a time domain resource attribute of a symbol or a slot is NA, it represents that the DU cannot use the symbol or the slot. A time domain resource attribute may also be called an HSNA type of a time domain resource, etc. An MT and a DU of an IAB node only support time division multiplexing on a cell or a carrier, but do not support frequency division multiplexing.

The embodiments of the present disclosure provide a resource attribute configuring method, where a relationship between resource configuration of frequency domain and resource configuration of time domain is considered, and thus, frequency domain resource attribute configuration of an IAB resource is expanded, in order to implement FDM, and the FDM may also be used in combination with the time division multiplexing, so as to support a flexible multiplexing mode, thus a resource conflict and a mutual interference between IAB nodes can be avoided, and a resource is multiplexed more efficiently in a relay network.

FIG. 1 is a flow chart of a resource attribute configuring method provided by an embodiment. The method applies to a configuring side, for example, a CU. As shown in FIG. 1, the method provided by this embodiment includes step 110 and step 120.

In step 110, at least one frequency domain resource attribute mode is configured.

A frequency domain resource attribute of a configured side refers to an HSNA type of a frequency domain resource, that is, the frequency domain resource attribute is hard, soft or unavailable. An HSNA type of the time domain resource and an HSNA type of the frequency domain resource may be collectively referred to as a resource attribute. The frequency domain resource includes one or more RB sets, and each RB set is configured with a corresponding frequency domain resource attribute, which may be H, S or NA.

A frequency domain resource attribute mode may be understood as a combination case of frequency domain resource attributes of different RB sets on a carrier or a cell, for example, frequency domain resource attributes of X RBs or RB sets are configured as H, frequency domain resource attributes of Y RBs or RB sets are configured as S, and/or frequency domain resource attributes of Z RBs or RB sets are configured as NA, etc. Numbers X, Y, Z of RBs or RB sets with different frequency domain resource attributes may be the same or may be different, X, Y, or Z may be 0, but none of X, Y, or Z is greater than a total number of RB or RB sets on the carrier or the cell. In addition, the sum of numbers of RBs with various frequency domain resource attributes is not greater than a total number of RBs on the carrier or the cell.

At least one frequency domain resource attribute mode may be configured for each cell or each carrier, respectively.

In step 120, configuration information of the at least one frequency domain resource attribute mode is transmitted, where the configuration information is used to indicate a frequency domain resource attribute of a target time domain resource, and the frequency domain resource attribute of the target time domain resource meets one of the at least one frequency domain resource attribute mode.

In this embodiment, a CU may transmit the configuration information to a DU to indicate that the frequency domain resource attribute of the target time domain resource meets one of the at least one frequency domain resource attribute mode.

A granularity indicating the frequency domain resource attribute of the target time domain resource may be one or more time domain resource types on each indication slot, for example, in an indication slot 1, a frequency domain resource attribute of a time domain resource of which a time domain resource type is DL meets a frequency domain resource attribute mode 1, a frequency domain resource attribute of a time domain resource of which a time domain resource type is UL and NA meets a frequency domain resource attribute mode 2, etc.; a granularity indicating the frequency domain resource attribute of the target time domain resource may also be each indication slot, for example, the frequency domain resource attribute of the time domain resources in an indication slot 2 meets a frequency domain resource attribute mode 3, etc.; a granularity indicating the frequency domain resource attribute of the target time domain resource may also be a group of slots within a configuration period, for example, in a configuration period, a frequency domain resource attribute of a time domain resource in a first group of slots meets a frequency domain resource attribute mode 4, the frequency domain resource attribute of the time domain resource in a second group of slots meets a frequency domain resource attribute mode 5, etc.; a granularity indicating the frequency domain resource attribute of the target time domain resource may also be one or more time domain resource types on a group of slots within a configuration period, for example, in a configuration period, a frequency domain resource attribute of a time domain resource of which a time domain resource type is DL in a first group of slots meets a frequency domain resource attribute mode 6, a frequency domain resource attribute of a time domain resource of which a time domain resource type is UL meets a frequency domain resource attribute mode 7, etc.

A granularity indicating the frequency domain resource attribute of the target time domain resource may also be one or more time domain resource attributes on a group of slots within a configuration period. For example, in a configuration period, a frequency domain resource attribute of a time domain resource of which a time domain resource attribute is H in a first group of slots meets a frequency domain resource attribute mode 8, a frequency domain resource attribute of a time domain resource of which a time domain resource attribute is NA meets a frequency domain resource attribute mode 9, etc. In this embodiment, it can be considered that the configuration of the frequency domain resource attribute covers or rewrites the configuration of the time domain resource attribute.

On this basis, the frequency domain resource attribute of the target time domain resource may be determined according to an indication slot and a configuration period to which the target time domain resource belongs, and a time domain resource type and/or a time domain resource attribute of a group of slots/the target time domain resource within the configuration period. The indication slot refers to a time domain unit used to indicate a frequency domain resource attribute of a time domain resource, and may also be called an HSNA slot. For example, taking 10 slots as an indication slot, a frequency domain resource attribute mode in which a CU configures this indication slot meets one of the at least one frequency domain resource attribute mode. For example, the target time domain resource is a time domain resource of one indication slot, where a frequency domain resource attribute of X time domain resources is H, a frequency domain resource attribute of Y time domain resources is S, and a frequency domain resource attribute of Z time domain resources are NA, etc.

In an embodiment, the at least one frequency domain resource attribute mode includes a first frequency domain resource attribute mode, and configuration information of the first frequency domain resource attribute mode includes at least one of:

a first resource block set of which the frequency domain resource attribute is hard, and location information of X resource blocks corresponding to the first resource block set; a second resource block set of which the frequency domain resource attribute is soft, and location information of Y resource blocks corresponding to the second resource block set; a third resource block set of which the frequency domain resource attribute is unavailable, and location information of Z resource blocks corresponding to the third resource block set; where X is an integer greater than or equal to 0, Y is an integer greater than or equal to 0, and Z is an integer greater than or equal to 0.

The frequency domain resource attribute mode in this embodiment configures or indicates a frequency domain resource attribute of a frequency domain resource by an RB set, and enables the configured side (for example, DU) to be capable of determining the frequency domain resource attribute of the frequency domain resource corresponding to the target time domain resource according to which RB set where the frequency domain resource is located by configuring or indicating the RB set with a specific frequency domain resource attribute and locations of RBs in the RB set.

In an embodiment, location information of RBs in the RB set may be configured or indicated according to the following ways:

configuring or indicating a location of a start RB of the RB set, for example, indicating an offset of the start RB relative to a start RB of a carrier or a cell, and configuring or indicating a total bandwidth or a number of RBs of the RB set; configuring or indicating RBs contained in the RB set using a bitmap, where each bit in the bitmap corresponds to one or more RBs, if a value of a bit is 1, one or more RBs corresponding to the bit of which the value is 1 belong to the RB set; combining the two ways described above, for example, configuring or indicating a continuous RB set 1 by the way of indicating a start RB location and a total bandwidth, and then, within the RB set 1, indicating an RB set 2 using a bitmap, that is, the RB set 2 may be a subset of the RB set 1, or an RB set may be composed of multiple RB sets.

In an embodiment, there is at least one resource block set in a target carrier or a target cell, and each resource block set consists of resource blocks at specified locations; the at least one frequency domain resource attribute mode includes a second frequency domain resource attribute mode, and configuration information of the second frequency domain resource attribute mode includes at least one of:

at least one resource block set of which a frequency domain resource attribute is hard; at least one resource block set of which a frequency domain resource attribute is soft; and at least one resource block set of which a frequency domain resource attribute is unavailable.

The frequency domain resource attribute mode in this embodiment configures or indicates a frequency domain resource attribute of a frequency domain resource by an RB set, and enables the configuring side (for example, DU) to be capable of determining the frequency domain resource attribute of the frequency domain resource corresponding to the target time domain resource according to which RB set where the frequency domain resource is located by defining the RB set and configuring or indicating the RB set with a specific frequency domain resource attribute. In an embodiment, a frequency domain resource without indicating a frequency domain resource attribute is a default attribute, where the default attribute is hard, soft or unavailable.

In this embodiment, for a frequency domain resource of which a frequency domain resource attribute is not indicated in the configuration information, a frequency domain resource attribute of the frequency domain resource is the default attribute, that is, if the frequency domain resource corresponding to the target time domain resource is not indicated with the frequency domain resource attribute, the configured side may determine these frequency domain resources as the default attribute. The default attribute is H, S, or NA.

In an embodiment, for a frequency domain resource of which a frequency domain resource attribute is not indicated but the time domain resource attribute is indicated in the configuration information, a frequency domain resource attribute of the frequency domain resource is the time domain resource attribute.

In an embodiment, the at least one frequency domain resource attribute mode includes a third frequency domain resource attribute mode, and configuration information of the third frequency domain resource attribute mode includes location information of resource blocks in at least one resource block set, and a frequency domain resource attribute of each resource block set.

The frequency domain resource attribute mode in this embodiment configures or indicates a frequency domain resource attribute of a frequency domain resource by an RB set, and enables the configured side (for example, DU) to be capable of determining the frequency domain resource attribute of the frequency domain resource corresponding to the target time domain resource according to which RB set where the frequency domain resource is located by configuring or indicating locations of RBs in a specific RB set and a frequency domain resource attribute of the specific RB set.

In an embodiment, there is at least one resource block set in a target carrier or a target cell, and each resource block set consists of resource blocks at specified locations; the at least one frequency domain resource attribute mode includes a fourth frequency domain resource attribute mode, and configuration information of the fourth frequency domain resource attribute mode includes a frequency domain resource attribute of the at least one resource block set.

The frequency domain resource attribute mode in this embodiment configures or indicates a frequency domain resource attribute of a frequency domain resource by an RB set, and enables the configured side (for example, DU) to be capable of determining the frequency domain resource attribute of the frequency domain resource corresponding to the target time domain resource according to which RB set where the frequency domain resource is located by defining a RB set and configuring or indicating a frequency domain resource attribute of a specific RB set.

In an embodiment, each frequency domain resource attribute mode corresponds to a respective index number; and the index number of each frequency domain resource attribute mode is indicated by signaling, or determined according to a location of the frequency domain resource attribute mode in the frequency domain resource attribute mode list.

For example, the CU is configured with N frequency domain resource attribute modes, of which index numbers are 1, 2 . . . N in sequence, where N is a positive integer.

In an embodiment, there are at least $q^p$ or $r*q^p$ frequency domain resource attribute modes, where p is a number of resource block sets within a target carrier or a target cell, q is a number of types of frequency domain resource attributes, and r is a number of time domain resource types; where the frequency domain resource attribute includes at least one of hard, soft and unavailable;

the time domain resource type includes at least one of uplink, downlink or flexible.

For example, if there are 10 RB sets within a target carrier or a target cell, the frequency domain resource attribute includes H, S, and NA, then there are at least $3^{10}$ types of frequency domain resource attribute modes; if the time domain resource type includes DL, UL and F, then there are at least $3*3^{10}$ types of frequency domain resource attribute modes.

In an embodiment, the frequency domain resource attribute mode includes cases that:

there is a frequency domain resource attribute of a time domain resource with at least one time domain resource type in an indication slot, where the frequency domain resource attribute is one of hard, soft, and unavailable; or there is a frequency domain resource attribute of the time domain resource with at least one time domain resource type in an indication slot, where the frequency domain resource attribute includes at least two of hard, soft and unavailable (that is, multiple frequency domain resource attributes are configured on the frequency domain by an RB set).

For example, a frequency domain resource attribute mode is configured as:

in HSNA slot 1, a frequency domain resource attribute of a time domain resource of which a time domain resource type is DL, is H;

or configured as:

in HSNA slot 1, a frequency domain resource attribute of a time domain resource of which a time domain resource type is DL and UL, is H;

or configured as:

in HSNA slot 1, a frequency domain resource attribute of a time domain resource of which a time domain resource type is F meets a first frequency domain resource attribute mode, that is, in the frequency domain resource corresponding to the target time domain resource, the frequency domain resource attribute of the resource of X RBs belonging to the RB set 1 is H, the frequency domain resource attribute of the resource of Y RBs belonging to the RB set 2 is S, and the frequency domain resource attribute of the resource of Z RBs belonging to the RB set 3 is NA.

In an embodiment, the frequency domain resource attribute mode includes at least one of cases that:

in an indication slot, there is a frequency domain resource attribute of a time domain resource with at least one time domain resource type being a first type of attribute, where the first type of attribute is hard, soft or unavailable; and in an indication slot, there is a frequency domain resource attribute of a time domain resource with at least one time domain resource type being a second type of attribute, where the second type of attribute includes at least two of hard, soft and unavailable.

In this embodiment, according to whether the frequency domain resource attributes of the time domain resource with a time domain resource type are all the same within an indication slot, the frequency domain resource attribute modes are divided into two types, a first type of the two types refers to that the frequency domain resource attributes of the time domain resources with a time domain resource type are all H, all S, or all NA; and a second type of the two types refers to that the frequency domain resource attributes of the time domain resources with a time domain resource type may include at least two of H, S and NA by an RB set, the second type of the frequency domain resource attribute mode may also be understood as a mode configured by an RB set, this mode configured by the RB set may more finely configure the availability of the frequency domain resources, and thus, the flexibility for multiplexing frequency domain resources is improved. In this case, configuration information transmitted by the CU may be used to indicate whether the frequency domain resource attribute of the target time domain resource meets the first type of the frequency domain resource attribute mode or the second type of the frequency domain resource attribute mode, if it is the first type of the frequency domain resource attribute mode, the configuration information is used to indicate that the frequency domain resource attribute of the time domain resource with at least one time domain resource type is all H, all S, or all NA; if it is the second type of the frequency domain resource attribute mode, the configuration information is used to indicate that the frequency domain resource attribute of the time domain resource with at least one time domain resource type is configured by a RB set.

In an embodiment, the frequency domain resource attribute mode includes at least one of cases that:

in an indication slot, a frequency domain resource attribute of a time domain resource of which a time domain resource type is uplink, is a first type of attribute or a second type of attribute; in an indication slot, a frequency domain resource attribute of a time domain resource of which a time domain resource type is downlink, is a first type of attribute or a second type of attribute; in an indication slot, a frequency domain resource attribute of a time domain resource of which a time domain resource type is flexible, is a first type of attribute or a second type of attribute; where the first type of attribute is hard, soft or unavailable; and the second type of attribute includes at least two of hard, soft and unavailable.

In this embodiment, the frequency domain resources are divided into three types according to the time domain resource types (DL, UL and F). On this basis, according to whether the frequency domain resource attributes of the time domain resource with a time domain resource type are all the same within an indication slot, the frequency domain resource attribute modes are divided into two types, the first type of the two types refers to that the frequency domain resource attributes of the time domain resource with a time domain resource type are the first type of attribute (i.e., all H, all S or all NA); the second type of the two types is a mode configured by an RB set, the frequency domain resource attributes of the time domain resource with a time domain resource type may include at least two of H, S and NA (i.e., the second type of attribute).

In an embodiment, the frequency domain resource attribute mode includes at least one of cases that:

in an indication slot, a frequency domain resource attribute of a time domain resource of which a time domain resource type is uplink, includes at least two of hard, soft and unavailable; in an indication slot, a frequency domain resource attribute of a time domain resource of which a time domain resource type is downlink, includes at least two of hard, soft and unavailable; in an indication slot, a frequency domain resource attribute of a time domain resource of which a time domain resource type is flexible, includes at least two of hard, soft and unavailable.

In this embodiment, the frequency domain resources are divided into three types according to the time domain resource types (DL, UL and F). On this basis, the frequency domain resource attributes of the time domain resource with a time domain resource type within an indication slot are all H, all S or all NA, that is, the frequency domain resource attributes of the time domain resource with a time domain resource type are the first type of attribute, without considering a mode configured by an RB set or the second type of attribute.

In an embodiment, the frequency domain resource attribute of the target time domain resource is determined according to an indication slot where the target time domain resource is located and a time domain resource type of the target time domain resource.

In this embodiment, a configured or indicated granularity is an indication slot and one or more time domain resource types, the configured side (for example, DU) may determine which frequency domain resource attribute mode the target time domain resource meets according to an indication slot to which the target time domain resource belongs and a time domain resource type (DL, UL and/or F). On this basis, according to the frequency domain resource attribute mode, the configured side may determine the frequency domain resource attribute according to which RB set the frequency domain resources corresponding to the target time domain resource are located.

In an embodiment, the frequency domain resource attribute mode includes cases that:

in an indication slot, there is a frequency domain resource attribute of a time domain resource with at least one time domain resource type being a first type of attribute, where the first type of attribute is hard, soft or unavailable; or, a frequency domain resource attribute of a time domain resource in an indication slot are a second type of attribute, where the second type of attribute includes at least two of hard, soft and unavailable; where the frequency domain resource attribute of the target time domain resource is determined according to an indication slot where the target time domain resource is located and a time domain resource type of the target time domain resource; or, the frequency domain resource attribute of the target time domain resource is determined according to an indication slot where the target time domain resource is located.

In this embodiment, a configured or indicated granularity is an indication slot, and the frequency domain resource attribute mode is configured as that: frequency domain resource attributes of a time domain resource with a specific time domain resource type within an indication slot are the same, or frequency domain resource attributes of all time domain resources within an indication slot meet a mode configured by an RB set, that is, frequency domain resource attributes of all time domain resources within an indication slot may include at least two of H, S and NA (i.e. the second type of attribute).

In an embodiment, the frequency domain resource attribute mode includes cases that: a frequency domain resource attribute of a time domain resource in each indication slot including at least two of hard, soft and unavailable; where the frequency domain resource attribute of the target time domain resource is determined according to an indication slot where the target time domain resource is located.

In this embodiment, the frequency domain resource attribute mode is configured as that: frequency domain resource attributes of all time domain resources within an indication slot meet a mode configured by an RB set, that is, frequency domain resource attributes of all time domain resources within an indication slot may include at least two of H, S and NA (i.e. the second type of attribute).

In an embodiment, the frequency domain resource attribute mode includes a case that:

in a configuration period, there is a frequency domain resource attribute of a time domain resource with at least one time domain resource type, where the frequency domain resource attribute includes at least two of hard, soft and unavailable, where the configuration period includes at least one slot; where the frequency domain resource attribute of the target time domain resource is determined according to the configuration period where the target time domain resource is located and a time domain resource type of the target time domain resource.

In this embodiment, the configured or indicated granularity is a configuration period, where the configuration period may include one or more slots.

In an embodiment, the frequency domain resource attribute mode includes at least one of:

a fifth frequency domain resource attribute mode, where configuration information of the fifth frequency domain resource attribute mode includes: a time domain resource applicable to the fifth frequency domain resource attribute mode, and/or a slot set applicable to the fifth frequency domain resource attribute mode; a sixth frequency domain resource attribute mode, where configuration information of the sixth frequency domain resource attribute mode includes: a time domain resource with a specified time domain resource type on a group of slots applicable to the sixth frequency domain resource attribute mode; a seventh frequency domain resource attribute mode, where configuration information of the seventh frequency domain resource attribute mode includes: a resource with a specified time domain resource type applicable to the seventh frequency domain resource attribute mode; where the frequency domain resource attribute of the target time domain resource is determined according to applicable resources of the frequency domain resource attribute mode.

In this embodiment, the configuration information is used to indicate a resource range applicable to a specific frequency domain resource attribute mode.

In an embodiment, the method further includes:

step 100: determining a configuration type of a resource attribute, where the resource attribute includes a frequency domain resource attribute and a time domain resource type; the configuration type of the resource attribute includes:

a first configuration type: configuring a time domain resource type of a time domain resource of each symbol direction in each slot; and a second configuration type: configuring a frequency domain resource attribute of a time domain resource in each slot, or configuring a frequency domain resource attribute of a time domain resource of each symbol direction in each slot.

A frequency domain resource attribute mode may configure an RB set of three frequency domain resource attributes (H, S and NA), and may also configure an RB set of one or two of three frequency domain resource attributes.

The following examples illustrate configuring methods of the frequency domain resource attribute mode by taking cases where the three frequency domain resource attributes are all configured as an example.

Example 1

Configuration information of the frequency domain resource attribute mode includes:

```
{
    an RB set of which the frequency domain resource attribute is H, where the RB
set of which the frequency domain resource attribute is H may be indicated by location
information of corresponding X RBs within a carrier or a cell;
    an RB set of which the frequency domain resource attribute is S, where the RB
set of which the frequency domain resource attribute is S may be indicated by location
information of corresponding Y RBs within a carrier or a cell;
    an RB set of which the frequency domain resource attribute is NA, where the RB
set of which the frequency domain resource attribute is NA may be indicated by location
information of corresponding Z RBs within a carrier or a cell;
}
    or, multiple RB sets are defined, for example, a list of RB sets includes:
{
    an RB set 1, where the RB set 1 may be indicated by location information of a
corresponding group of RBs within a carrier or a cell;
    an RB set 2, where the RB set 2 may be indicated by location information of
another corresponding group of RBs within a carrier or a cell;
    ......
    an RB set p, where the RB set p may be indicated by location information of yet
another corresponding group of RBs within a carrier or a cell;
}
    on this basis, at least one frequency domain resource attribute mode is configured,
where configuration information of each frequency domain resource attribute mode
includes:
{
    an RB set of which the frequency domain resource attribute is H, which is at least
one of the above RB sets 1~p, or is empty;
    an RB set of which the frequency domain resource attribute is S, which is at least
one of the above RB sets 1~p, or is empty;
    an RB set of which the frequency domain resource attribute is NA, which is at
least one of the above RB sets 1~p, or is empty;
}.
```

In an example, if a value of X, Y or Z is 0, or an RB set of a frequency domain resource attribute is empty, the corresponding configuration information may be omitted. For example, one frequency domain resource attribute mode configures that an RB set of which the frequency domain resource attribute is H includes X=0 RB, or configures that an RB set of which frequency domain resource attribute is H is empty, then an RB of which the frequency domain resource attribute is H is not indicated in the configuration information transmitted by the CU.

In an example, for RB sets of which a frequency domain resource attribute is not indicated within a carrier or a cell, the frequency domain resource attributes of such RB sets are a default attribute, where the default attribute is H, S, or NA; or configuration information of RB sets of which a frequency domain resource attribute is the default attribute may be omitted, for example, if a frequency domain resource attribute mode does not configure frequency domain resource attributes of RBs 1~10, then the frequency domain resource attributes of RBs 1~10 are the default attribute.

Example 2

Configuration information of the frequency domain resource attribute mode includes:

```
{
    locations of RBs contained in RB set 1, and a frequency domain resource attribute
of RB set 1, which may be H, S or NA;
    locations of RBs contained in RB set 2, a frequency domain resource attribute of
RB set 2, which may be H, S or NA;
    ......
    locations of RBs contained in RB set p, a frequency domain resource attribute of
RB set p, which may be H, S or NA;
}
    or, multiple RB sets are defined, for example, a list of RB sets includes:
{
    an RB set 1, where the RB set 1 may be indicated by location information of a
corresponding group of RBs within a carrier or a cell;
    an RB set 2, where the RB set 2 may be indicated by location information of
another corresponding group of RBs within a carrier or a cell;
    ......
    an RB set p, where the RB set p may be indicated by location information of yet
another corresponding group of RBs within a carrier or a cell;
}
    on this basis, at least one frequency domain resource attribute mode is configured,
where configuration information of each frequency domain resource attribute mode
includes:
{
    an RB set 1, and a frequency domain resource attribute of the RB set 1, which
may be H, S or NA;
```

-continued

--- an RB set 2, and a frequency domain resource attribute of the RB set 2, which may be H, S or NA;

......

an RB set p, and a frequency domain resource attribute of the RB set p, which may be H, S or NA;

}.

---

In an example, for RB sets of which a frequency domain resource attribute is not indicated within a carrier or a cell, the frequency domain resource attributes of such RB sets are the default attribute, where the default attribute is H, S, or NA; or, configuration information of the RB sets of which the frequency domain resource attributes are default attribute may be omitted, for example, if a frequency domain resource attribute mode does not configure the frequency domain resource attributes of RBs 1~10, then the frequency domain resource attributes of RBs 1~10 are the default attribute.

Example 3

In this example, a frequency domain resource attribute mode configured by the CU may be multiple, and the frequency domain resource attribute of the target time domain resource meets one of multiple frequency domain resource attribute modes, for example, meets one of example 1 or example 2.

A list of frequency domain resource attribute modes includes:

---

{
a frequency domain resource attribute mode 1;
a frequency domain resource attribute mode 2;
......
a frequency domain resource attribute mode N;
}.

---

In an example, each frequency domain resource attribute mode corresponds to an index number, where the index number may be explicitly indicated, for example, indicated by a CU to a DU, or implicitly determined by a location of a corresponding frequency domain resource attribute mode in a list of frequency domain resource attribute modes, for example, index numbers corresponding to the frequency domain resource attribute modes in the list of frequency domain resource attribute modes is 1, 2, . . . N in sequence. N is a positive integer.

In an example, a number N of frequency domain resource attribute modes is equal to $q^p$, where p is a total number of RB sets involved in configuring a frequency domain resource attribute mode, q is a number of types of the frequency domain resource attributes involved in configuring a frequency domain resource attribute mode (for example, when RB sets of which the frequency domain resource attributes are H, S, and NA are configured, q=3; and when RB sets of which frequency domain resource attributes are H and S are configured, q=2).

In an example, a number of frequency domain resource attribute modes $N=r*(q^p)$, where p is a total number of RB sets involved in configuring a frequency domain resource attribute mode, q is a number of types of frequency domain resource attributes involved in configuring a frequency domain resource attribute mode, and r is a number of the time domain resource types (DL, UL and/or F) in an indication slot.

In examples 4-7, the configuration information is used to indicate a frequency domain resource attribute of a time domain resource with one or more time domain resource types on each indication slot, that is, an indicated granularity is one or more time domain resource types on each indication slot, and correspondingly, the target time domain resource refers to a time domain resource with one or more time domain resource types on an indication slot.

In examples 4-7, a frequency domain resource attribute of the target time domain resource is one of the four: H; S; NA; at least two of H, S and NA (which may also be understood that the frequency domain resource attribute mode meets a mode configured by an RB set), which is determined according to a time domain resource type and an indication slot to which the target time domain resource belongs.

At least one frequency domain resource attribute mode may be a frequency domain resource attribute mode in examples 1 to 3, that is, the frequency domain resource attributes are configured or indicated according to different RB sets, and such frequency domain resource attribute modes may also be called as modes configured by RB sets, which are denoted by frequency domain resource attribute modes 1 to N. In addition, there are also frequency domain resource attribute modes that do not configure or indicate the frequency domain resource attributes by RB sets, that is, frequency domain resource attributes of the target time domain resource are all H, all S, or all NA, which may be used as three frequency domain resource attribute modes, respectively.

In an example, when a CU transmits configuration information to a DU to indicate that the frequency domain resource attribute of the target time domain resource meets a frequency domain resource attribute mode, for the target time domain resource, the frequency domain resource attributes are understood according to a frequency domain resource attribute mode indicated by the CU. For example, a CU transmits configuration information to indicate that the frequency domain resource attribute of the time domain resource with one or more time domain resource types (DL, UL and/or F) on an indication slot meets the frequency domain resource attribute mode 1, where the frequency domain resource attribute mode 1 is as described in example 1, then for the target time domain resource on the indication slot, frequency domain resource attributes of RBs located on locations of X RBs are H, frequency domain resource attributes of RBs located on locations of Y RBs are S, and frequency domain resource attributes of RBs located on locations of Z RBs are NA.

Example 4

In this example, configuration information of a frequency domain resource attribute mode may be indicated by an HSNA slot configuration list, and there are M HSNA slots in total, where M is a positive integer. In an example, a value of M is determined by a number of slots contained in a configuration period. A CU may transmit configuration information to a DU to indicate which frequency domain resource attribute mode the frequency domain resource attribute of a time domain resource (i.e., a symbol) with specific one or more time domain resource types meet within an indication slot.

The HSNA slot configuration list is as follows (taking the frequency domain resource attributes of three time domain resource types DL, UL and F being all configured as an example, only one or two of the frequency domain resource attributes of three time domain resource types DL, UL and F may also be configured in practical applications):

```
{
>HSNA slot configuration 1:
{
>>a frequency domain resource attribute of a symbol of which a time domain
resource type is DL within an indication slot are one of the four: H; S; NA; meeting a mode
configured by an RB set, for example, a frequency domain resource attribute mode in
examples 1-3, which may include at least two of H, S and NA;
>>a frequency domain resource attributes of a symbol of which a time domain
resource type is UL within an indication slot are one of the four: H; S; NA; meeting a mode
configured by the RB sets, for example, a frequency domain resource attribute mode in
examples 1-3, which may include at least two of H, S and NA;
>>a frequency domain resource attributes of a symbol of which a time domain
resource type is F within an indication slot are one of the four: H; S; NA; meeting a mode
configured by the RB sets, for example, a frequency domain resource attribute mode in
examples 1-3, which may include at least two of H, S and NA;
}
>HSNA slot configuration 2:
......
>HSNA slot configuration M:
{
>>a frequency domain resource attribute of a symbol of which a time domain
resource type is DL within an indication slot is one of the four: H; S; NA; meeting a mode
configured by an RB set, for example, a frequency domain resource attribute mode in
examples 1-3, which may include at least two of H, S and NA;
>>a frequency domain resource attributes of a symbol of which a time domain
resource type is UL within an indication slot are one of the four: H; S; NA; meeting a mode
configured by the RB sets, for example, a frequency domain resource attribute mode in
examples 1-3, which may include at least two of H, S and NA;
>>a frequency domain resource attribute of a symbol of which a time domain
resource type is F within an indication slot is one of the four: H; S; NA; meeting a mode
configured by the RB sets, for example, a frequency domain resource attribute mode in
examples 1-3, which may include at least two of H, S and NA;
}
}.
```

On this basis, the configured side may determine which frequency domain resource attribute mode the frequency domain resource attribute meets according to a time domain resource type and an indication slot to which the target time domain resource belongs. For example, the target time domain resource belongs to the HSNA slot configuration M, then frequency domain resource attributes of symbols of which the time domain resource type is DL in the target time domain resource are all H, all S, or all NA, or meet a mode configured by an RB set (which may include at least two of H, S and NA, for example, a frequency domain resource attribute of a specified RB set is H, a frequency domain resource attribute of a specified RB set is S, and/or a frequency domain resource attribute of a specified RB set is NA).

Table 1 is a frequency domain resource attribute configuration table within an HSNA configuration period. An HSNA configuration period may include M HSNA slots. An indicated granularity is one or more time domain resource types on each indication slot.

TABLE 1

| Frequency domain resource attribute configuration table within an HSNA configuration period | | |
| --- | --- | --- |
| Frequency domain resource attribute configuration | Indication slot | Frequency domain resource attribute mode |
| >Indication slot (HSNA slot) configuration item | HSNA slot 1~HSNA slot M | |
| A time domain resource of which a time domain resource type is DL within an indication slot | | A frequency domain resource attribute of a time domain resource of which a time domain resource type is DL within an indication slot meets one of the frequency domain resource attribute modes: { all H; all S; all NA; frequency domain resource attribute mode 1; frequency domain resource attribute mode 2; ...... frequency domain resource attribute mode N; } |

TABLE 1-continued

Frequency domain resource attribute configuration
table within an HSNA configuration period

| Frequency domain resource attribute configuration | Indication slot | Frequency domain resource attribute mode |
|---|---|---|
| A time domain resource of which a time domain resource types is UL within an indication slot | | A frequency domain resource attribute of a time domain resource of which a time domain resource type is UL within an indication slot meets one of the frequency domain resource attribute modes: { all H; all S; all NA; frequency domain resource attribute mode 1; frequency domain resource attribute mode 2; ...... frequency domain resource attribute mode N; } |
| A time domain resource of which a time domain resource type is F within an indication slot | | A frequency domain resource attribute of a time domain resource of which a time domain resource type is F within an indication slot meets one of the frequency domain resource attribute modes: { all H; all S; all NA; frequency domain resource attribute mode 1; frequency domain resource attribute mode 2; ...... frequency domain resource attribute mode N; } |

A frequency domain resource attribute mode in the frequency domain resource attribute configuration table of each example of the present disclosure may only be indicated as an index number corresponding to a frequency domain resource attribute mode, that is, a CU may indicate the index number of the frequency domain resource attribute mode that the target time domain resource meets, to a DU by the configuration information.

Example 5

In this example, configuration information of a frequency domain resource attribute mode may be indicated by an HSNA slot configuration list, and there are M HSNA slots in total, where M is a positive integer. A CU may transmit configuration information to a DU to indicate whether a frequency domain resource attribute of a time domain resource (i.e., a symbol) with specific one or more time domain resource types within an indication slot meet type 1 (all H, all S, or all NA) or meet type 2 (that is, by an RB set, multiple frequency domain resource attributes are configured on the frequency domain, which may also be understood as that the frequency domain resource attribute mode is a mode configured by an RB set).

The HSNA slot configuration list is as follows (taking the frequency domain resource attributes of three time domain resource types DL, UL and F being all configured as an example, only one or two of the frequency domain resource attributes of three time domain resource types DL, UL and F may also be configured in practical applications).

An HSNA resource attribute configuration slot list is as follows:

```
{
>HSNA slot configuration 1:
    {
    >>a configuration type of a frequency domain resource attribute of a symbol
within an indication slot is one of:
    >>>Type 1
    >>>>a frequency domain resource attribute of a symbol of which a time domain
resource type is DL within an indication slot is configured as one of: H, S, NA;
    >>>>a frequency domain resource attribute of a symbol of which a time domain
resource type is UL within an indication slot is configured as one of: H, S, NA;
    >>>>a frequency domain resource attribute of a symbol of which a time domain
resource type is F within an indication slot is configured as one of: H, S, NA;
    >>>Type 2
    >>>>a frequency domain resource attribute of a symbol of which a time domain
resource type is DL within an indication slot meets a mode configured by an RB set, for
example, a frequency domain resource attribute mode in examples 1-3, which may
include at least two of H, S and NA;
```

-continued

---

>>>>a frequency domain resource attribute of a symbol of which a time domain
resource type is UL within an indication slot meets a mode configured by an RB set, for
example, a frequency domain resource attribute mode in examples 1-3, which may
include at least two of H, S and NA;
   >>>>a frequency domain resource attribute of a symbol of which a time domain
resource type is F within an indication slot meet a mode configured by an RB set, for
example, a frequency domain resource attribute mode in examples 1-3, which may
include at least two of H, S and NA;
   }
   >HSNA slot configuration 2:
   ......
   >HSNA slot configuration M:
   }.

---

On this basis, the configured side may determine whether a frequency domain resource attribute meets type 1 or type 2 according to a time domain resource type and an indication slot to which the target time domain resource belongs. If type 1 is met, a frequency domain resource attribute of a time domain resource with a corresponding time domain resource type is determined as all H, all S or all NA according to the configuration information; and if type 2 is met, configuration of a frequency domain resource attribute of a time domain resource with a corresponding time domain resource type by an RB set is determined according to the configuration information.

Table 2 is a frequency domain resource attribute configuration table within an HSNA configuration period. An HSNA configuration period may include M HSNA slots. An indication granularity is one or more time domain resource types on each indication slot.

TABLE 2

| Frequency domain resource attribute configuration table within an HSNA configuration period | | | |
| --- | --- | --- | --- |
| Frequency domain resource attribute configuration | Indication slot | Frequency domain resource attribute mode | Semantic description |
| >Indication slot (HSNA slot) configuration item >>Configure or indicate a type of a frequency domain resource attribute >>>Type 1 | HSNA slot 1~HSNA slot M | | |
| | | | Type 1 does not distinguish RB sets, that is, a frequency domain resource attribute of a time domain resource with a specific time domain resource type within an indication slot are all H, all S, or all NA |
| A time domain resource of which a time domain resource type is DL within an indication slot | | A frequency domain resource attribute of a time domain resource of which a time domain resource type is DL within an indication slot meets one of the frequency domain resource attribute modes: { all H; all S; all NA; } | A frequency domain resource attribute of a time domain resource of which a time domain resource type is DL within an indication slot |

TABLE 2-continued

| Frequency domain resource attribute configuration table within an HSNA configuration period | | | |
|---|---|---|---|
| Frequency domain resource attribute configuration | Indication slot | Frequency domain resource attribute mode | Semantic description |
| A time domain resource of which a time domain resource type is UL within an indication slot | | A frequency domain resource attribute of a time domain resource of which a time domain resource type is UL within an indication slot meets one of the frequency domain resource attribute modes: { all H; all S; all NA; } | A frequency domain resource attribute of a time domain resource of which a time domain resource type is UL within an indication slot |
| A time domain resource of which a time domain resource type is F within an indication slot | | A frequency domain resource attribute of a time domain resource of which a time domain resource type is F within an indication slot meets one of the frequency domain resource attribute modes: { all H; all S; all NA; } | A frequency domain resource attribute of a time domain resource of which a time domain resource type is F within an indication slot |
| >>>Type 2 | | | Type 2 is configuring a frequency domain resource attribute of a time domain resource with a specific time domain resource type within an indication slot by an RB set. |
| A time domain resource of which a time domain resource type is DL within an indication slot | | A frequency domain resource attribute of a time domain resource of which a time domain resource type is DL within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource of which a time domain resource type is DL within an indication slot is configured by an RB set |
| A time domain resource of which a time domain resource type is UL within an indication slot | | A frequency domain resource attribute of a time domain resource of which a time domain resource type is UL within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource of which a time domain resource type is UL within an indication slot is configured by an RB set |

TABLE 2-continued

| Frequency domain resource attribute configuration table within an HSNA configuration period | | | |
|---|---|---|---|
| Frequency domain resource attribute configuration | Indication slot | Frequency domain resource attribute mode | Semantic description |
| A Time domain resource of which a time domain resource type is F within an indication slot | | A frequency domain resource attribute of a time domain resource of which a time domain resource type is F within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource of which a time domain resource type is F within an indication slot is configured by an RB set |

Example 6

In this example, configuration information of the frequency domain resource attribute mode may be indicated by an HSNA slot configuration list, and there are M HSNA slots in total, where M is a positive integer. A CU may transmit the configuration information to a DU to indicate that which time domain resource type of a symbol within an indication slot is indicated, and indicate whether a frequency domain resource attribute of a time domain resource type of a symbol meets type 1 (all H, all S, or all NA) or type 2 (that is, multiple frequency domain resource attributes are configured on the frequency domain by an RB set, which may also be understood as that the frequency domain resource attribute mode is a mode configured by an RB set).

An HSNA slot configuration list is as follows:

```
{
>HSNA slot configuration 1:
    {
>>for a symbol of which a time domain resource type is DL within
an indication slot, and a frequency domain resource attribute of the
symbol are configured as a type of:
    >>>type 1: a frequency domain resource attribute of a symbol is
configured as one of: H, S, NA;
    >>>type 2: a frequency domain resource attribute of a symbol
meets a mode configured by an RB set, for example, a frequency domain
resource attribute mode in examples 1-3, which may include at least
two of H, S and NA.
    >>a configuration type of a frequency domain resource attribute
of a symbol of which a time domain resource type is UL within an
indication slot is one of:
    >>>type 1: a frequency domain resource attribute of a symbol is
configured as one of: H, S, NA;
    >>>type 2: a frequency domain resource attribute of a symbol
meets a mode configured by an RB set, for example, a frequency domain
resource attribute mode in examples 1-3, which may include at least
two of H, S and NA.
    >>a configuration type of a frequency domain resource attribute
of a symbol of which a time domain resource type is F within an
indication slot is one of:
```

-continued

```
    >>>type 1: a frequency domain resource attribute of a symbol is
configured as one of: H, S, NA;
    >>>type 2: a frequency domain resource attribute of a symbol
meets a mode configured by an RB set, for example, a frequency domain
resource attribute mode in examples 1-3, which may include at least
two of H, S and NA.
    }
>HSNA slot configuration 2:
    ......
>HSNA slot configuration M:
    }.
```

On this basis, the configured side may first determine which of the three time domain resource types the frequency domain resource attribute meets according to a time domain resource type and an indication slot to which the target time domain resource belongs, and then determine whether the frequency domain resource attribute meets type 1 or type 2 according to the configuration information. If Type 1 is met, a frequency domain resource attribute of a time domain resource with a corresponding time domain resource type is determined as all H, all S or all NA according to the configuration information; and if type 2 is met, configuration of a frequency domain resource attribute of a time domain resource with a corresponding time domain resource type by an RB set is determined according to the configuration information.

Table 3 is a frequency domain resource attribute configuration table within an HSNA configuration period. An HSNA configuration period may include M HSNA slots. An indication granularity is one or more time domain resource types on each indication slot.

TABLE 3

| Frequency domain resource attribute configuration table within an HSNA configuration period | | | |
|---|---|---|---|
| Frequency domain resource attribute configuration | Indication slot | Frequency domain resource attribute mode | Semantic description |
| >Indication slot (HSNA slot) configuration item >>Symbol of which a time domain resource type is DL within an indication slot | HSNA slot 1~HSNA slot M | | |
| >>>Type 1 | | A frequency domain resource attribute of a time domain resource of which a time domain resource type is DL within an indication slot meets one of the frequency domain resource attribute modes: { all H; all S; all NA; } | Type 1 does not distinguish RB sets, that is, a frequency domain resource attribute of symbol of which a time domain resource type is DL within an indication slot is all H, all S, or all NA |
| >>>Type 2 | | A frequency domain resource attribute of a time domain resource of which a time domain resource type is DL within an indication slot meets one of the frequency domain resource attribute modes: { frequency domain resource attribute mode 1; frequency domain resource attribute mode 2; ...... frequency domain resource attribute mode N; } | Type 2 is configuring a frequency domain resource attribute of a symbol of which a time domain resource type is DL within an indication slot by an RB set |
| >>Symbol of which time domain resource types are UL within an indication slot | | | |
| >>>Type 1 | | A frequency domain resource attribute of a time domain resource of which a time domain resource type is UL within an indication slot meets one of the frequency domain resource attribute modes: { all H; all S; all NA; } | Type 1 does not distinguish RB sets, that is, a frequency domain resource attribute of a symbol of which a time domain resource type is UL within an indication slot is all H, all S, or all NA |
| >>>Type 2 | | A frequency domain resource attribute of a time domain resource of which a time domain resource type is UL within an indication slot meets one of the frequency domain resource attribute modes: { frequency domain resource attribute mode 1; frequency domain resource attribute mode 2; ...... frequency domain resource attribute mode N; } | Type 2 is configuring a frequency domain resource attribute of a symbol of which a time domain resource type is UL within an indication slot by an RB set |

TABLE 3-continued

Frequency domain resource attribute configuration
table within an HSNA configuration period

| Frequency domain resource attribute configuration | Indication slot | Frequency domain resource attribute mode | Semantic description |
|---|---|---|---|
| >>Symbol of which a time domain resource type is F within an indication slot | | | |
| >>>Type 1 | | A frequency domain resource attribute of a time domain resource of which a time domain resource type is F within an indication slot meets one of the frequency domain resource attribute modes: { all H; all S; all NA; } | Type 1 does not distinguish RB sets, that is, a frequency domain resource attribute of a symbol of which a time domain resource type is F within an indication slot is all H, all S, or all NA |
| >>>Type 2 | | A frequency domain resource attribute of a time domain resource of which a time domain resource type is F within an indication slot meets one of the frequency domain resource attribute modes: { frequency domain resource attribute mode 1; frequency domain resource attribute mode 2; ...... frequency domain resource attribute mode N; } | Type 2 is configuring a frequency domain resource attribute of a symbol of which a time domain resource type is F within an indication slot by an RB set |

Example 7

In this example, configuration information of the frequency domain resource attribute mode may be indicated by an HSNA slot configuration list, and there are M HSNA slots in total, where M is a positive integer. A CU may transmit the configuration information to a DU to indicate that a frequency domain resource attribute of a symbol with a specific time domain resource type within an indication slot meets a frequency domain resource attribute mode. The frequency domain resource attribute mode in this example mainly refers to a mode configured by an RB set, that is, multiple frequency domain resource attributes are configured on the frequency domain by an RB set.

An HSNA resource attribute configuration slot list is as follows:

```
}
>HSNA slot configuration 1:
{
    >>a frequency domain resource attribute of a symbol of which a
time domain resource type is DL within an indication slot meets a mode
configured by an RB set, for example, a frequency domain resource
attribute mode in examples 1-3, which may include at least two of
H, S and NA;
    >>a frequency domain resource attribute of a symbol of which a
time domain resource type is UL within an indication slot meets a mode
```

-continued

```
configured by an RB set, for example, a frequency domain resource
attribute mode in examples 1-3, which may include at least two of
H, S and NA;
    >>a frequency domain resource attribute of a symbol of which a
time domain resource type is F within an indication slot meets a mode
configured by an RB set, for example, a frequency domain resource
attribute mode in examples 1-3, which may include at least two of
H, S and NA;
    }
    >HSNA slot configuration 2:
    ......
    >HSNA slot configuration M:
    }.
```

On this basis, the configured side may first determine which of the three time domain resource types the frequency domain resource attribute meets according to a time domain resource type and an indication slot to which the target time domain resource belongs, and then determine configuration of the frequency domain resource attribute of the time domain resource with a corresponding time domain resource type by an RB set according to the configuration information.

Table 4 is a frequency domain resource attribute configuration table in an HSNA configuration period. An HSNA configuration period may include M HSNA slots. An indication granularity is one or more time domain resource types on each indication slot.

TABLE 4

Frequency domain resource attribute configuration
table in an HSNA configuration period

| Frequency domain resource attribute configuration | Indication slot | Frequency domain resource attribute mode | Semantic description |
|---|---|---|---|
| >Indication slot (HSNA slot) configuration item A time domain resource of which a time domain resource type is DL within an indication slot | HSNA slot 1~HSNA slot M | A frequency domain resource attribute of a time domain resource of which a time domain resource type is DL within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource of which a time domain resource type is DL within an indication slot is configured by an RB set |
| A time domain resource of which a time domain resource type is UL within an indication slot | | A frequency domain resource attribute of a time domain resource of which a time domain resource type is UL within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource of which a time domain resource type is UL within an indication slot is configured by an RB set |
| Time domain resources of which time domain resource types are F within an indication slot | | A frequency domain resource attribute of a time domain resource of which a time domain resource type is F within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource of which a time domain resource type is F within an indication slot is configured by an RB set |

In examples 8-9, the configuration information is used to indicate a frequency domain resource attribute of a time domain resource on each indication slot, that is, an indicated granularity is each indication slot, and correspondingly, the target time domain resource refers to a time domain resource on an indication slot.

In examples 8-9, the frequency domain resource attribute of the target time domain resource is one of the four: H; S; NA; at least two of H, S and NA (that is, the frequency domain resource attribute includes at least two of H, S and NA by an RB set), which is determined according to an indication slot to which the target time domain resource belongs, or determined according to a time domain resource type and an indication slot to which the target time domain resource belongs.

Example 8

In this example, configuration information of a frequency domain resource attribute mode may be indicated by an HSNA slot configuration list, and there are M HSNA slots in total, where M is a positive integer. A CU may transmit the configuration information to a DU to indicate that a frequency domain resource attribute of a symbol with a specific time domain resource type within an indication slot meets type 1 (all H, all S, or all NA), or indicate that frequency domain resource attribute of the time domain resource within an indication slot meets type 2 (that is, multiple frequency domain resource attributes are configured on the frequency domain by an RB set, which may also be understood as that the frequency domain resource attribute mode is a mode configured by an RB set).

An HSNA slot configuration list is as follows:

```
{
>HSNA slot configuration 1:
{
    >>the frequency domain resource attribute configuration
within an indication slot is one of the types:
    >>>Type 1
    >>>>frequency domain resource attribute configuration of a symbol
of which a time domain resource type is DL within an indication slot is
one of: H, S, NA;
    >>>>frequency domain resource attribute configuration of a symbol
of which a time domain resource type is UL within an indication slot is
one of: H, S, NA;
    >>>>a frequency domain resource attribute of a symbol of which a
time domain resource type is F within an indication slot meets a mode
configured by the RB set;
    >>>Type 2
    frequency domain resource attributes of all symbols within an
indication slot meet a mode configured by an RB set.
```

-continued

```
}
>HSNA slot configuration 2;
.....
>HSNA slot configuration M:
}.
```

On this basis, the configured side determines whether a frequency domain resource attribute of a time domain resource with a corresponding time domain resource type meets type 1 or type 2 according to an indication slot to which the target time domain resource belongs. If type 1 is met, the frequency domain resource attribute of the time domain resource with a corresponding time domain resource type is determined as all H, all S, or all NA according to the configuration information; if type 2 is met, configuration of the frequency domain resource attribute of the time domain resource with a corresponding time domain resource type by an RB set is determined according to the configuration information.

Table 5 is a frequency domain resource attribute configuration table within an HSNA configuration period. An HSNA configuration period may include M HSNA slots. An indication granularity is each indication slot.

TABLE 5

| Frequency domain resource attribute configuration | Indication slot | Frequency domain resource attribute mode | Semantic description |
|---|---|---|---|
| Frequency domain resource attribute configuration table within an HSNA configuration period | | | |
| >Indication slot (HSNA slot) configuration item >>Configure or indicate A type of a frequency domain resource attribute | HSNA slot 1~HSNA slot M | | |
| >>>Type 1 | | | Type 1 does not distinguish RB sets, that is, the frequency domain resource attributes of symbols of which time domain resource types are F within an indication slot are all H, all S, or all NA |
| A time domain resource of which a time domain resource type is DL within an indication slot | | A frequency domain resource attribute of a time domain resource of which a time domain resource type is DL within an indication slot meets one of the frequency domain resource attribute modes: { all H; all S; All NA; } | A frequency domain resource attribute of a time domain resource of which a time domain resource type is DL within an indication slot |
| A time domain resource of which a time domain resource type is UL within an indication slot | | A frequency domain resource attribute of a time domain resource of which a time domain resource type is UL within an indication slot meets one of the frequency domain resource attribute modes: { all H; all S; All NA; } | A frequency domain resource attribute of a time domain resource of which a time domain resource type is UL within an indication slot |

TABLE 5-continued

Frequency domain resource attribute configuration
table within an HSNA configuration period

| Frequency domain resource attribute configuration | Indication slot | Frequency domain resource attribute mode | Semantic description |
|---|---|---|---|
| A time domain resource of which a time domain resource type is F within an indication slot | | A frequency domain resource attribute of a time domain resource of which a time domain resource type is F within an indication slot meets one of the frequency domain resource attribute modes: { all H; all S; All NA; } | A frequency domain resource attribute of a time domain resource of which a time domain resource type is F within an indication slot |
| >>>Type 2 | | | Type 2 is configuring a frequency domain resource attribute of symbols of which a time domain resource type is F within an indication slot by the RB set |
| All symbols within an indication slot | | A frequency domain resource attributes of time domain resource of which a time domain resource type is DL within an indication slot meets one of the frequency domain resource attribute modes: { frequency domain resource attribute mode 1; frequency domain resource attribute mode 2; ...... frequency domain resource attribute mode N; } | A frequency domain resource attribute within an indication slot is configured by an RB set |

Example 9

In this example, configuration information of the frequency domain resource attribute mode may be indicated by an HSNA slot configuration list, and there are M HSNA slots in total, where M is a positive integer. A CU may transmit the configuration information to a DU to indicate that a frequency domain resource attribute of a time domain resource within an indication slot meets a frequency domain resource attribute mode, and the frequency domain resource attribute mode in this example mainly refers to a mode configured by an RB set.

An HSNA slot configuration list is as follows:

```
{
  >HSNA slot configuration 1:
  {
  frequency domain resource attributes of all symbols within a
  configuration slot meet a mode configured by an RB set.
  }
  >HSNA slot configuration 2:
  ......
  >HSNA slot configuration M:
}.
```

On this basis, the configured side may determine which mode configured by an RB set the frequency domain resource attribute meets according to an indication slot to which the target time domain resource belongs.

Table 6 is a frequency domain resource attribute configuration table within an HSNA configuration period. An HSNA configuration period may include M HSNA slots. An indication granularity is each indication slot.

TABLE 6

| Frequency domain resource attribute configuration table within an HSNA configuration period | | | |
|---|---|---|---|
| Frequency domain resource attribute configuration | Indication slot | Frequency domain resource attribute mode | Semantic description |
| >Indication slot (HSNA slot) configuration item >>A time domain resource within an indication slot | HSNA slot 1~HSNA slot M | A frequency domain resource attribute of a time domain resource within an indication slot meets one of the frequency domain resource attribute modes: { frequency domain resource attribute mode 1; frequency domain resource attribute mode 2; ...... frequency domain resource attribute mode N; } | A frequency domain resource attribute of a time domain resource within an indication slot is configured by an RB set |

In examples 10-11, the configuration information is used to indicate a frequency domain resource attribute of a time domain resource of each configuration period, that is, an indicated granularity is each configuration period, and correspondingly, the target time domain resource refers to a time domain resource of a configuration period.

In examples 10-11, the frequency domain resource attribute of the target time domain resource is one of the four: H; S; NA; at least two of H, S and NA (that is, the frequency domain resource attribute is configured by an RB set), which is determined according to an indication slot to which the target time domain resource belongs, or determined according to a time domain resource type and an indication slot to which the target time domain resource belongs.

A configuration period may be a DUF transmission period or an HSNA transmission period. The DUF transmission period and the HSNA transmission period may be equal or not equal.

The target time domain resource may also be a time domain resource of which a time domain resource type are DL, UL and/or F within a configuration period; may also be a resource of which a time domain resource type is H, S and/or NA; may also be a resource of which a time domain resource type and a time domain resource attribute are combined, for example, Hard DL resource (i.e., a resource of which a time domain resource type is DL and a time domain resource attribute is H), Soft DL resource, Hard UL resource, Soft UL resource, Hard F resource, and Soft F resource. A frequency domain resource attribute of the target time domain resource is determined according to a time domain resource type, a time domain resource attribute and/or an indication slot to which the target time domain resource belongs.

The configuration period may also include at least one group of slots, each group of slots includes one or more slots. Correspondingly, the target time domain resource may also be a time domain resource with one or more time domain resource types and a time domain resource attribute on a group of slots within the configuration period.

Example 10

In this example, a CU may transmit the configuration information to a DU to indicate that within a configuration period, a frequency domain resource attribute of a time domain resource with one or more time domain resource types meets a frequency domain resource attribute mode, the frequency domain resource attribute mode in this example mainly refers to a mode configured by an RB set, that is, as in examples 1 to 3, a frequency domain resource attribute of a target time domain resource is determined by an RB location in the RB set. A configured or indicated granularity is a configuration period.

An HSNA configuration list is as follows:

```
{
>the target time domain resource belongs to a time domain resource
of which a time domain resource type is DL within X slots within the
configuration period, the CU also configures or indicates locations of
the X slots;
    >>configure frequency domain resource attributes of all DL
symbols within the X slots to meet a mode by an RB set;
    >>configure frequency domain resource attributes of all UL symbols
within the X slots to meet a mode by an RB set;
    >>configure frequency domain resource attributes of all F symbols
within the X slots to meet a mode by an RB set;
}.
```

Example 11

In this example, a CU may transmit the configuration information to a DU to indicate a time domain resource applicable to each frequency domain resource attribute mode within a configuration period. The frequency domain resource attribute mode in this example mainly refers to a mode configured by an RB set. A configured or indicated granularity is a configuration period, and optionally, the configured or indicated granularity may also include a time domain resource type and/or a time domain resource attribute.

An HSNA configuration list is as follows:

```
{
frequency domain resource attribute mode 1:
>is applicable to a time domain resource with a specified time
domain resource attribute (H, S and/or NA); may also indicate a slot
set, and only a time domain resource with a specified time domain
resource attribute on these slot sets is applicable to the
frequency domain resource attribute mode 1;
    frequency domain resource attribute mode 2:
    >is applicable to a time domain resource with a specified time
domain resource type (D, H and/or F) on a group of slots, or a time
domain resource with a specified time domain resource attribute (H, S
and/or NA), or a time domain resource with a specified time domain
resource type and time domain resource attribute (Hard DL, Soft DL,
Hard UL, Soft UL, Hard F and/or Soft F);
    ......
    frequency domain resource attribute mode N:
    >is applicable to a target time domain resource with one or more
time domain resource types and/or time domain resource attributes;
}
In an example, an HSNA configuration list is as follows:
{
frequency domain resource attribute mode 1:
    >is applicable to a slot set in a configuration period, only a
time domain resource on these slot sets is applicable to the frequency
domain resource attribute mode 1.
    frequency domain resource attribute mode 2:
    >indicates that an applicable scope is a target time domain
resource with one or more time domain resource types and/or time
domain resource attributes;
    ......
    frequency domain resource attribute mode N:
    >indicates that an applicable scope is a target time domain
resource with one or more time domain resource types and/or time
domain resource attributes;
    }.
```

Example 12

This example is used to illustrate a hierarchy of selection of the resource configuration type. Example 6 described above is configuration or indication of the frequency domain resource attribute for the time domain resource with one or more time domain resource types of each indication slot; examples 5 and 8 are configuration or indication of the frequency domain resource attribute for the time domain resource of each indication slot. In addition, a configuration type of a resource attribute may also be selected or configured, type 1 is that all time domain resources use a time domain resource attribute configuring mode, and type 2 is that all time domain resources use a frequency domain resource attribute configuring mode.

For example, DU resource configuration of a cell or a carrier includes:

```
{
subcarrier spacing;
DUF transmission period;
DUF slot configuration list;
>DUF configuration information of each slot
HSNA transmission period;
a configuration type selected to be used by the HSNA slot
configuration list is one of:
>Type 1,
{
configuring a time domain resource attribute of an indication
slot 1, for example, configuring a time domain resource attribute of
each time domain resource type (DL, UL and F) of the indication slot 1;
```

-continued

```
configuring a time domain resource attribute of an indication
slot 2, for example, configuring a time domain resource attribute of
each time domain resource type (DL, UL and F) of the indication slot 2;
    ........
}
>Type 2
{
configuring a frequency domain resource attribute of a slot 1,
for example, configuring a frequency domain resource attribute of a
symbol with all time domain resource types or a symbol with each time
domain resource type of the slot 1;
    configuring a frequency domain resource attribute of a slot 2,
for example, configuring a frequency domain resource attribute of a
symbol with all time domain resource types or a symbol with each time
domain resource type of the slot 2;
    ......
}.
```

The configuration information in this embodiment may be transmitted from a CU to a DU, or transmitted from a CU to another CU, for example, to notify another CU the configuration information of the DU, or transmitted from a DU to another DU, for example, to notify another DU the configuration information of the DU, or a CU transmits, to a DU, the configuration information of a sub DU of the DU, for example, the CU transmits the configuration information of a DU of an IAB node 2 to a DU of an IAB node 1.

The embodiments of the present disclosure provide a resource attribute determining method, which is applied to the configured side, for example, DU. A DU determines a frequency domain resource attribute of the target time domain resource according to the configuration information to implement the FDM, and the FDM may also be used in combination with the time division multiplexing, so as to support a flexible multiplexing mode, thus a resource conflict and a mutual interference between IAB nodes can be avoided, and a resource is multiplexed more efficiently in a relay network.

Figure 2:
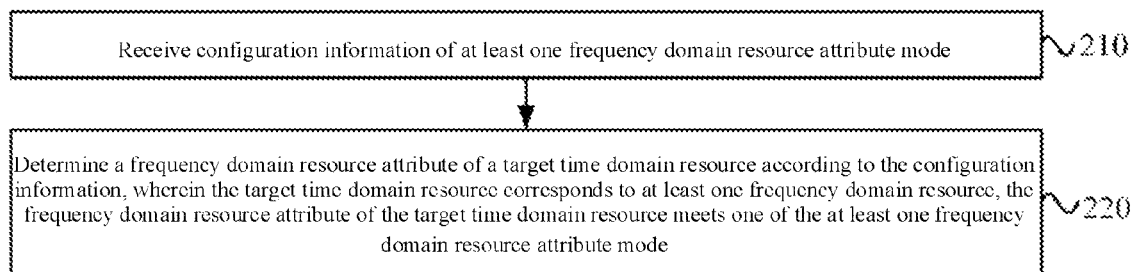
FIG. 2 is a flow chart of a resource attribute determining method provided by an embodiment.

FIG. 2 is a flow chart of a resource attribute determining method provided by an embodiment. The method is applied to a configured side, for example, DU. As shown in FIG. 2, the method provided by the embodiment includes step 210 and step 220.

In step 210, configuration information of at least one frequency domain resource attribute mode is received.

In step 220, a frequency domain resource attribute of a target time domain resource is determined according to the configuration information, where the target time domain resource corresponds to at least one frequency domain resource, and the frequency domain resource attribute of the target time domain resource meet one of the at least one frequency domain resource attribute mode.

In this embodiment, the configured side receives configuration information transmitted by the configured side, to determine that the frequency domain resource attribute of the target time domain resource meets one of the at least one frequency domain resource attribute mode. The frequency domain resource attribute of the target time domain resource may be determined according to an indication slot and a configuration period to which the target time domain resource belongs, and a time domain resource type of the target time domain resource and/or a slot group within the configuration period. For example, taking 10 slots as an indication slot, the CU configures the frequency domain resource attribute mode of this indication slot to meet one of the at least one frequency domain resource attribute mode, the target time domain resource is a time domain resource of the indication slot, where frequency domain resource attributes of X time domain resources are H, frequency domain resource attributes of Y time domain resources are S, and frequency domain resource attributes of Z time domain resources are NA, etc.

For technical details not described in detail in the embodiment, please refer to any of the above embodiments.

In an embodiment, the at least one frequency domain resource attribute mode includes a first frequency domain resource attribute mode, and configuration information of the first frequency domain resource attribute mode includes at least one of:

a first resource block set of which a frequency domain resource attribute is hard, and location information of X resource blocks corresponding to the first resource block set; a second resource block set of which a frequency domain resource attribute is soft, and location information of Y resource blocks corresponding to the second resource block set; a third resource block set of which a frequency domain resource attribute is unavailable, and location information of Z resource blocks corresponding to the third resource block set; where X is an integer greater than or equal to 0, Y is an integer greater than or equal to 0, and Z is an integer greater than or equal to 0.

On this basis, the configured side may determine a frequency domain resource attribute of a frequency domain resource corresponding to the target time domain resource according to which RB set the frequency domain resource corresponding to the target time domain resource is located. For example, the frequency domain resource attribute of the frequency domain resource belonging to the first resource block set in the target time domain resource is hard; the frequency domain resource attribute of the frequency domain resource belonging to the second resource block set is soft; and the frequency domain resource attribute of the frequency domain resource belonging to the third resource block set is unavailable.

In an embodiment, there is at least one resource block set within a target carrier or a target cell, each resource block set consists of resource blocks at specified locations; the at least one frequency domain resource attribute mode includes a second frequency domain resource attribute mode, and configuration information of the second frequency domain resource attribute mode includes at least one of:

at least one resource block set of which a frequency domain resource attribute is hard; at least one resource block set of which a frequency domain resource attribute is soft; and at least one resource block set of which a frequency domain resource attribute is unavailable.

On this basis, the configured side may determine a frequency domain resource attribute of a frequency domain resource corresponding to the target time domain resource according to which RB set the frequency domain resource corresponding to the target time domain resource is located. For example, the frequency domain resource attribute of the frequency domain resource belonging to a resource block set of which a frequency domain resource attribute is hard in the target time domain resource, is hard; the frequency domain resource attribute of the frequency domain resource belonging to a resource block set of which a frequency domain resource attribute is soft, is soft; and the frequency domain resource attribute of the frequency domain resource belonging to a resource block set of which a frequency domain resource attribute is unavailable, is unavailable.

In an embodiment, a frequency domain resource of which a frequency domain resource attribute is not indicated, is a default attribute, where the default attribute is hard, soft, or unavailable.

On this basis, for a frequency domain resource of which a frequency domain resource attribute is not indicated in the configuration information, the frequency domain resource attribute of the frequency domain resource is the default attribute, that is, if the frequency domain resource corresponding to the target time domain resource is not indicated with a frequency domain resource attribute, the configured side may determine these frequency domain resources as a default attribute. The default attribute is H, S, or NA.

In an embodiment, the at least one frequency domain resource attribute mode includes a third frequency domain resource attribute mode, where configuration information of the third frequency domain resource attribute mode includes location information of resource blocks in at least one resource block set, and a frequency domain resource attribute of each resource block set.

On this basis, the configured side may determine a frequency domain resource attribute of a frequency domain resource corresponding to the target time domain resource according to which RB set the frequency domain resource corresponding to the target time domain resource is located. For example, a frequency domain resource attribute of a frequency domain resource belonging to a resource block set in the target time domain resource is a frequency domain resource attribute of the resource block set.

In an embodiment, there is at least one resource block set within a target carrier or a target cell, each resource block set consists of resource blocks at specified locations; the at least one frequency domain resource attribute mode includes a fourth frequency domain resource attribute mode, where configuration information of the fourth frequency domain resource attribute mode includes a frequency domain resource attribute of at least one resource block set.

On this basis, the configured side may determine a frequency domain resource attribute of a frequency domain resource corresponding to the target time domain resource according to which RB set the frequency domain resource corresponding to the target time domain resource is located. For example, a frequency domain resource attribute of a frequency domain resource belonging to a resource block set in the target time domain resource is a frequency domain resource attribute of the resource block set.

In an embodiment, each frequency domain resource attribute mode corresponds to a respective index number; the index number of each frequency domain resource attribute mode is indicated by signaling, or determined according to a location of this frequency domain resource attribute mode in the frequency domain resource attribute mode list.

In an embodiment, there are at least $q^p$ or $r*q^p$ frequency domain resource attribute modes, where p is a number of resource block sets in a target carrier or a target cell, q is a number of types of frequency domain resource attributes, and r is a number of time domain resource types; where the frequency domain resource attributes include at least one of hard, soft and unavailable.

The time domain resource type includes at least one of uplink, downlink or flexible.

In an embodiment, the frequency domain resource attribute mode includes cases that:

in an indication slot, there is a frequency domain resource attribute of a time domain resource with at least one time domain resource type, where the frequency domain resource attribute is one of hard, soft, and unavailable; or in an indication slot, there is a frequency domain resource attribute of a time domain resource with at least one time domain resource type, where the frequency domain resource attribute includes at least two of hard, soft and unavailable.

In an embodiment, the frequency domain resource attribute mode includes at least one of cases that:

in an indication slot, there is a frequency domain resource attribute of a time domain resource with at least one time domain resource type being the first type of attribute, where the first type of attribute is hard, soft or unavailable; in an indication slot, there is a frequency domain resource attribute of a time domain resource with at least one time domain resource type being the second type of attribute, where the second type of attribute includes at least two of hard, soft and unavailable.

For example, according to the indication of the configuration information, the frequency domain resource attribute of the time domain resource with the time domain resource type corresponding to the frequency domain resource attribute mode in the target time domain resource is hard, soft or unavailable; and the frequency domain resource attribute of the time domain resource with the time domain resource type corresponding to the frequency domain resource attribute mode include at least two of hard, soft and unavailable.

In an embodiment, the frequency domain resource attribute mode includes at least one of cases that:

in an indication slot, a frequency domain resource attribute of a time domain resource of which a time domain resource type is uplink, is a first type of attribute or a second type of attribute; in an indication slot, a frequency domain resource attribute of a time domain resource of which a time domain resource type is downlink, is a first type of attribute or a second type of attribute; and in an indication slot, a frequency domain resource attribute of a time domain resource of which a time domain resource type is flexible, is a first type of attribute or a second type of attribute; where the first type of attribute is hard, soft or unavailable; the second type of attribute includes at least two of hard, soft and unavailable.

For example, according to the indication of the configuration information, the frequency domain resource attribute of the time domain resource of which the time domain resource type is uplink in the target time domain resource is the first type of attribute or the second type of attribute, the frequency domain resource attribute of the time domain resource of which the time domain resource type is downlink in the target time domain resource is the first type of attribute or the second type of attribute; the frequency domain resource attribute of the time domain resource of which the time domain resource type is flexible in the target time domain resource is the first type of attribute or the second type of attribute.

In an embodiment, the frequency domain resource attribute mode includes at least one of cases that:

in an indication slot, a frequency domain resource attribute of a time domain resource of which a time domain resource type is uplink includes at least two of hard, soft and unavailable; in an indication slot, a frequency domain resource attribute of a time domain resource type is downlink includes at least two of hard, soft and unavailable; in an indication slot, a frequency domain resource attribute of a time domain resource of which a time domain resource type is flexible includes at least two of hard, soft and unavailable.

In an embodiment, a frequency domain resource attribute of a target time domain resource is determined according to an indication slot where the target time domain resource is located, and a time domain resource type of the target time domain resource.

On this basis, the configured side (for example, DU) may determine which frequency domain resource attribute mode the target time domain resource meets according to an indication slot to which the target time domain resource belongs and a time domain resource type (DL, UL and/or F). According to this frequency domain resource attribute mode, the configured side may determine a frequency domain resource attribute according to which RB set the frequency domain resource corresponding to the target time domain resource is located. For example, according to the indication of the configuration information, the frequency domain resource attribute of the time domain resource with the time domain resource type corresponding to the frequency domain resource attribute mode in the target time domain resource includes at least two of hard, soft and unavailable. Frequency domain resource attributes of time domain resources with different time domain resource types may be different.

In an embodiment, the frequency domain resource attribute mode includes cases that:

in an indication slot, there is a frequency domain resource attribute of a time domain resource with at least one time domain resource type being a first type of attribute, where the first type of attribute is hard, soft or unavailable; or a frequency domain resource attribute of a time domain resource in an indication slot is a second type of attribute, where the second type of attribute includes at least two of hard, soft and unavailable; where the frequency domain resource attribute of the target time domain resource is determined according to an indication slot where the target time domain resource is located and a time domain resource type of the target time domain resource; or, the frequency domain resource attribute of the target time domain resource is determined according to an indication slot where the target time domain resource is located.

On this basis, the configured side (for example, DU) may determine which frequency domain resource attribute mode the target time domain resource meets, according to an indication slot to which the target time domain resource belongs, or according to a time domain resource type and an indication slot to which the target time domain resource belongs. According to this frequency domain resource attribute mode, the configured side may determine a frequency domain resource attribute according to which RB set the frequency domain resource corresponding to the target time domain resource is located. For example, according to the indication of the configuration information, a frequency domain resource attribute of the time domain resource with the time domain resource type corresponding to the frequency domain resource attribute mode in the target time domain resource is the first type of attribute, or include at least two of hard, soft and unavailable, where frequency domain resource attributes of the time domain resource with different time domain resource types may be different.

In an embodiment, the frequency domain resource attribute mode includes a case that:

a frequency domain resource attribute of a time domain resource in each indication slot includes at least two of hard, soft and unavailable; where the frequency domain resource attribute of the target time domain resource is determined according to an indication slot where the target time domain resource is located.

On this basis, the configured side (for example, DU) may determine which frequency domain resource attribute mode the target time domain resource meets according to an indication slot to which the target time domain resource belongs. According to this frequency domain resource attribute mode, the configured side may determine a frequency domain resource attribute according to which RB set the frequency domain resource corresponding to the target time domain resource is located.

In an embodiment, the frequency domain resource attribute mode includes a case that:

in a configuration period, there is a frequency domain resource attribute of a time domain resource with at least one time domain resource type, where the frequency domain resource attribute includes at least two of hard, soft and unavailable, where the configuration period includes at least one slot; where the frequency domain resource attribute of the target time domain resource is determined according to the configuration period where the target time domain resource is located and a time domain resource type of the target time domain resource.

On this basis, the configured side (for example, DU) may determine which frequency domain resource attribute mode the target time domain resource meets according to the configuration period to which the target time domain resource belongs and a time domain resource type. According to this frequency domain resource attribute mode, the configured side may determine the frequency domain resource attribute according to which RB set the frequency domain resource corresponding to the target time domain resource is located.

In an embodiment, the frequency domain resource attribute mode includes at least one of:

a fifth frequency domain resource attribute mode, where configuration information of the fifth frequency domain resource attribute mode includes: a time domain resource applicable to the fifth frequency domain resource attribute mode, and/or a slot set applicable to the fifth frequency domain resource attribute mode; a sixth frequency domain resource attribute mode, where configuration information of the sixth frequency domain resource attribute mode includes: a time domain resource with a specified time domain resource type on a group of slots applicable to the sixth frequency domain resource attribute mode;

a seventh frequency domain resource attribute mode, where configuration information of the seventh frequency domain resource attribute mode includes: a resource with a specified time domain resource type applicable to the seventh frequency domain resource attribute mode; where the frequency domain resource attribute of the target time domain resource is determined according to applicable resources of the frequency domain resource attribute mode.

On this basis, the configured side (for example, DU) may determine which frequency domain resource attribute mode the target time domain resource meets, according to which applicable frequency domain resource attribute mode of an applicable resource the target time domain resource belongs to. According to this frequency domain resource attribute mode, the configured side may determine the frequency domain resource attribute according to which RB set the frequency domain resource corresponding to the target time domain resource is located.

In an embodiment, the method also includes:

step 200: determining a configuration type of a resource attribute, where the resource attribute includes a frequency domain resource attribute and a time domain resource type; the configuration type of the resource attribute includes:

a first configuration type: configuring a time domain resource type of a time domain resource of each symbol direction in each slot; and a second configuration type: configuring a frequency domain resource attribute of a time domain resource in each slot, or configuring a frequency domain resource attribute of a time domain resource of each symbol direction in each slot.

A resource attribute configuring device provided by the following embodiment and the resource attribute configuring method provided by the above embodiment belong to the same concept, and the technical details not described in detail in the following embodiment may be found in any of the above embodiments, and the following embodiment has the same effect as that of the resource attribute configuring method.

Figure 3:
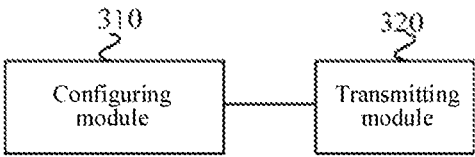
FIG. 3 is a structural schematic diagram of a resource attribute configuring device provided by an embodiment.

The embodiments of the present disclosure also provide a resource attribute configuring device. FIG. 3 is a structural schematic diagram of a resource attribute configuring device provided by an embodiment. As shown in FIG. 3, the resource attribute configuring device includes:

a configuring module 310, configured to configure at least one frequency domain resource attribute mode; and a transmitting module 320, configured to transmit configuration information of the at least one frequency domain resource attribute mode, where the configuration information is used to indicate a frequency domain resource attribute of a target time domain resource, and the frequency domain resource attribute of the target time domain resource meets one of the at least one frequency domain resource attribute mode.

The resource attribute configuring device of this embodiment, where a relationship between resource configuration of frequency domain and resource configuration of time domain is considered, and further, the frequency domain resource attribute configuration of an IAB resource is expanded, in order to implement FDM, and the FDM may also be used in combination with the time division multiplexing, so as to support a flexible multiplexing mode, thus a resource conflict and a mutual interference between IAB nodes can be avoided, and the resource is multiplexed more efficiently in the relay network.

In an embodiment, the at least one frequency domain resource attribute mode includes a first frequency domain resource attribute mode, where configuration information of the first frequency domain resource attribute mode includes at least one of:

a first resource block set of which a frequency domain resource attribute is hard, and location information of X resource blocks corresponding to the first resource block set; a second resource block set of which a frequency domain resource attribute is soft, and location information of Y resource blocks corresponding to the second resource block set; and a third resource block set of which a frequency domain resource attribute is unavailable, and location information of Z resource blocks corresponding to the third resource block set; where X is an integer greater than or equal to 0, Y is an integer greater than or equal to 0, and Z is an integer greater than or equal to 0.

In an embodiment, there is at least one resource block set within a target carrier or a target cell, each resource block set consists of resource blocks at specified locations; the at least one frequency domain resource attribute mode includes a second frequency domain resource attribute mode, where configuration information of the second frequency domain resource attribute mode includes at least one of:

at least one resource block set of which a frequency domain resource attribute is hard; at least one resource block set of which a frequency domain resource attribute is soft; and at least one resource block set of which a frequency domain resource attribute is unavailable.

In an embodiment, a frequency domain resource of which a frequency domain resource attribute is not indicated is a default attribute, where the default attribute is hard, soft, or unavailable.

In an embodiment, the at least one frequency domain resource attribute mode includes a third frequency domain resource attribute mode, where configuration information of the third frequency domain resource attribute mode includes location information of resource blocks in the at least one resource block set, and a frequency domain resource attribute of each resource block set.

In an embodiment, there is at least one resource block set within a target carrier or a target cell, where each resource block set consists of resource blocks at specified locations; the at least one frequency domain resource attribute mode includes a fourth frequency domain resource attribute mode, where configuration information of the fourth frequency domain resource attribute mode includes a frequency domain resource attribute of at least one resource block set.

In an embodiment, each frequency domain resource attribute mode corresponds to a respective index number; the index number of each frequency domain resource attribute mode is indicated by signaling, or determined according to a location of this frequency domain resource attribute mode in the frequency domain resource attribute mode list.

In an embodiment, there are at least $q^p$ or $r*q^p$ frequency domain resource attribute modes, where p is a number of resource block sets within a target carrier or a target cell, q is a number of types of frequency domain resource attributes, r is a number of time domain resource types; where the frequency domain resource attribute includes at least one of hard, soft and unavailable; and the time domain resource type includes at least one of uplink, downlink or flexible.

In an embodiment, the frequency domain resource attribute mode includes cases that:

there is a frequency domain resource attribute of a time domain resource with at least one time domain resource type in an indication slot, where the frequency domain resource attribute is one of hard, soft, and unavailable; or there is a frequency domain resource attribute of a time domain resource with at least one time domain resource type in an indication slot, where the frequency domain resource attribute includes at least two of hard, soft and unavailable.

In an embodiment, the frequency domain resource attribute mode includes at least one of cases that:

in an indication slot, there is a frequency domain resource attribute of a time domain resource with at least one time domain resource type being a first type of attribute, where the first type of attribute is hard, soft or unavailable; in an indication slot, there is a frequency domain resource attribute of a time domain resource with at least one time domain resource type being a second type of attribute, where the second type of attribute includes at least two of hard, soft and unavailable.

In an embodiment, the frequency domain resource attribute mode includes at least one of cases that:

in an indication slot, a frequency domain resource attribute of a time domain resource of which a time domain resource type is uplink is a first type of attribute or a second type of attribute; in an indication slot, a frequency domain resource attribute of a time domain resource of which a time domain resource types is downlink is a first type of attribute or a second type of attribute; and in an indication slot, a frequency domain resource attribute of a time domain resource of which a time domain resource type is flexible is a first type of attribute or a second type of attribute; where the first type of attribute is hard, soft or unavailable; and the second type of attribute includes at least two of hard, soft and unavailable.

In an embodiment, the frequency domain resource attribute mode includes at least one of cases that:

in an indication slot, a frequency domain resource attribute of a time domain resources of which a time domain resource type is uplink includes at least two of hard, soft and unavailable; in an indication slot, a frequency domain resource attribute of a time domain resource of which a time domain resource type is downlink includes at least two of hard, soft and unavailable; and in an indication slot, a frequency domain resource attribute of a time domain resource of which a time domain resource type is flexible includes at least two of hard, soft and unavailable.

In an embodiment, a frequency domain resource attribute of the target time domain resource is determined according to an indication slot where the target time domain resource is located and a time domain resource type of the target time domain resource.

In an embodiment, the frequency domain resource attribute mode includes cases that:

in an indication slot, there is a frequency domain resource attribute of a time domain resource with at least one time domain resource type being a first type of attribute, where the first type of attribute is hard, soft or unavailable; or a frequency domain resource attribute of a time domain resource in an indication slot is a second type of attribute, where the second type of attribute includes at least two of hard, soft and unavailable; where the frequency domain resource attribute of the target time domain resource is determined, according to an indication slot which the target time domain resource is located, and a time domain resource type of the target time domain resource; or, the frequency domain resource attribute of the target time domain resource is determined according to an indication slot which the target time domain resource is located.

In an embodiment, the frequency domain resource attribute mode includes cases that:

a frequency domain resource attribute of a time domain resource in each indication slot includes at least two of hard, soft and unavailable; where the frequency domain resource attribute of the target time domain resource is determined according to an indication slot where the target time domain resource is located.

In an embodiment, the frequency domain resource attribute mode includes:

in a configuration period, there is a frequency domain resource attribute of a time domain resource with at least one time domain resource type, where the frequency domain resource attribute includes at least two of hard, soft and unavailable, where the configuration period includes at least one slot; where the frequency domain resource attribute of the target time domain resource is determined according to the configuration period which the target time domain resource is located and a time domain resource type of the target time domain resource.

In an embodiment, the frequency domain resource attribute mode includes at least one of:

a fifth frequency domain resource attribute mode, where configuration information of the fifth frequency domain resource attribute mode includes: a time domain resource applicable to the fifth frequency domain resource attribute mode, and/or a slot set applicable to the fifth frequency domain resource attribute mode; a sixth frequency domain resource attribute mode, where configuration information of the sixth frequency domain resource attribute mode includes: a time domain resource with a specified time domain resource type on a group of slots applicable to the sixth frequency domain resource attribute mode; a seventh frequency domain resource attribute mode, where configuration information of the seventh frequency domain resource attribute mode includes: a resource with a specified time domain resource type applicable to the seventh frequency domain resource attribute mode; where the frequency domain resource attribute of the target time domain resource is determined according to applicable resources of the frequency domain resource attribute mode.

In an embodiment, the device also includes:

a configuration type determining module, configured to determine a configuration type of a resource attribute, where the resource attribute includes a frequency domain resource attribute and a time domain resource type; the configuration type of the resource attribute includes:

a first configuration type: configuring a time domain resource type of a time domain resource of each symbol direction in each slot; and a second configuration type: configuring a frequency domain resource attribute of a time domain resource in each slot, or configuring a frequency domain resource attribute of a time domain resource of each symbol direction in each slot.

The resource attribute configuring device provided by this embodiment and the resource attribute configuring method provided by the above embodiments belong to the same concept, and the technical details not described in detail in the embodiment may be found in any of the above embodiments, and this embodiment has the same effect as that of the resource attribute configuring method.

Figure 4:
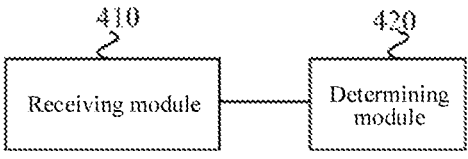
FIG. 4 is a structural schematic diagram of a resource attribute determining device provided by an embodiment.

The embodiments of the present disclosure also provide a resource attribute determining device. FIG. 4 is a structural schematic diagram of a resource attribute determining device provided by an embodiment. As shown in FIG. 4, the resource attribute determining device includes:

a receiving module 410, configured to receive configuration information of at least one frequency domain resource attribute mode; and a determining module 420, configured to determine a frequency domain resource attribute of a target time domain resource according to the configuration information, where the target time domain resource corresponds to at least one frequency domain resource, and the frequency domain resource attribute of the target time domain resource meet one of the at least one frequency domain resource attribute mode.

The resource attribute determining device of this embodiment determines the frequency domain resource attribute of the target time domain resource according to the configuration information to implement FDM, and the FDM may also be used in combination with the time division multiplexing, so as to support a flexible multiplexing mode, thus a resource conflict and a mutual interference between IAB nodes can be avoided, and a resource is multiplexed more efficiently in a relay network.

In an embodiment, the at least one frequency domain resource attribute mode includes a first frequency domain resource attribute mode, where configuration information of the first frequency domain resource attribute mode includes at least one of:

a first resource block set of which a frequency domain resource attribute is hard, and location information of X resource blocks corresponding to the first resource block set; a second resource block set of which a frequency domain resource attribute is soft, and location information of Y resource blocks corresponding to the second resource block set; a third resource block set of which a frequency domain resource attribute is unavailable, and location information of Z resource blocks corresponding to the third resource block set; where X is an integer greater than or equal to 0, Y is an integer greater than or equal to 0, and Z is an integer greater than or equal to 0.

In an embodiment, there is at least one resource block set within a target carrier or a target cell, each resource block set consists of resource blocks at specified locations; the at least one frequency domain resource attribute mode includes a second frequency domain resource attribute mode, where the configuration information of the second frequency domain resource attribute mode includes at least one of:

at least one resource block set of which a frequency domain resource attribute is hard; at least one resource block set of which a frequency domain resource attribute is soft; and at least one resource block set of which a frequency domain resource attribute is unavailable.

In an embodiment, a frequency domain resource of which a frequency domain resource attribute is not indicated, is a default attribute, where the default attribute is hard, soft, or unavailable.

In an embodiment, the at least one frequency domain resource attribute mode includes a third frequency domain resource attribute mode, where configuration information of the third frequency domain resource attribute mode includes location information of resource blocks in at least one resource block set, and a frequency domain resource attribute of each resource block set.

In an embodiment, there is at least one resource block set within a target carrier or a target cell, each resource block set consists of resource blocks at specified locations; the at least one frequency domain resource attribute mode includes a fourth frequency domain resource attribute mode, where configuration information of the fourth frequency domain resource attribute mode includes the frequency domain resource attribute of at least one resource block set.

In an embodiment, each frequency domain resource attribute mode corresponds to a respective index number; the index number of each frequency domain resource attribute mode is indicated by signaling, or determined according to a location of this frequency domain resource attribute mode in the frequency domain resource attribute mode list.

In an embodiment, there are at least $q^p$ or $r*q^p$ frequency domain resource attribute modes, where p is a number of resource block sets in a target carrier or a target cell, q is a number of types of frequency domain resource attributes, and r is a number of time domain resource types; where the frequency domain resource attribute includes at least one of hard, soft and unavailable; the time domain resource type includes at least one of uplink, downlink or flexible.

In an embodiment, the frequency domain resource attribute mode includes cases that:

in an indication slot, there is a frequency domain resource attribute of a time domain resource with at least one time domain resource type, where the frequency domain resource attribute is one of hard, soft, and unavailable; or, in an indication slot, there is a frequency domain resource attribute of a time domain resource with at least one time domain resource type, where the frequency domain resource attribute includes at least two of hard, soft and unavailable.

In an embodiment, the frequency domain resource attribute mode includes at least one of cases that:

in an indication slot, there is a frequency domain resource attribute of the time domain resource with at least one time domain resource type being a first type of attribute, where the first type of attribute is hard, soft or unavailable; and in an indication slot, there is a frequency domain resource attribute of a time domain resource with at least one time domain resource type being a second type of attribute, where the second type of attribute includes at least two of hard, soft and unavailable.

In an embodiment, the frequency domain resource attribute mode includes at least one of cases that:

in an indication slot, there is a frequency domain resource attribute of a time domain resource of which a time domain resource type is uplink being a first type of attribute or a second type of attribute; in an indication slot, a frequency domain resource attribute of a time domain resource of which a time domain resource type is downlink being a first type of attribute or a second type of attribute; in an indication slot, a frequency domain resource attribute of a time domain resource of which a time domain resource type is flexible being a first type of attribute or a second type of attribute; where the first type of attribute is hard, soft or unavailable; and where the second type of attribute includes at least two of hard, soft and unavailable.

In an embodiment, the frequency domain resource attribute mode includes at least one of cases that:

in an indication slot, a frequency domain resource attribute of a time domain resource of which a time domain resource type is uplink includes at least two of hard, soft and unavailable; in an indication slot, a frequency domain resource attribute of a time domain resource of which a time domain resource type is downlink includes at least two of hard, soft and unavailable; and in an indication slot, a frequency domain resource attribute of a time domain resource of which a time domain resource type is flexible includes at least two of hard, soft and unavailable.

In an embodiment, a frequency domain resource attribute of the target time domain resource is determined according to an indication slot where the target time domain resource is located, and a time domain resource type of the target time domain resource.

In an embodiment, the frequency domain resource attribute mode includes cases that:

in an indication slot, there is a frequency domain resource attribute of a time domain resource with at least one time domain resource type being a first type of attribute, where the first type of attribute is hard, soft or unavailable, or a frequency domain resource attribute of a time domain resource in an indication slot is a second type of attribute, where the second type of attribute includes at least two of hard, soft and unavailable; where the frequency domain resource attribute of the target time domain resource is determined according to an indication slot where the target time domain resource is located and a time domain resource type of the target time domain resource; or the frequency domain resource attribute of the target time domain resource is determined according to an indication slot where the target time domain resource is located.

In an embodiment, the frequency domain resource attribute mode includes a case that:

a frequency domain resource attribute of a time domain resource in each indication slot includes at least two of hard, soft and unavailable; a frequency domain resource attribute of the target time domain resource is determined according to an indication slot where the target time domain resource is located.

In an embodiment, the frequency domain resource attribute mode includes a case that:

in a configuration period, there is a frequency domain resource attribute of a time domain resource with at least one time domain resource type, where the frequency domain resource attribute includes at least two of hard, soft and unavailable, where the configuration period includes at least one slot; the frequency domain resource attribute of the target time domain resource is determined according to the configuration period where the target time domain resource is located and a time domain resource type of the target time domain resource.

In an embodiment, the frequency domain resource attribute mode includes at least one of:

a fifth frequency domain resource attribute mode, where configuration information of the fifth frequency domain resource attribute mode includes: a time domain resource applicable to the fifth frequency domain resource attribute mode, and/or a slot set applicable to the fifth frequency domain resource attribute mode; a sixth frequency domain resource attribute mode, where configuration information of the sixth frequency domain resource attribute mode includes: a time domain resource with a specified time domain resource type on a group of slots applicable to the sixth frequency domain resource attribute mode; a seventh frequency domain resource attribute mode, where configuration information of the seventh frequency domain resource attribute mode includes: a resource with a specified time domain resource type applicable to the seventh frequency domain resource attribute mode; where the frequency domain resource attribute of the target time domain resource is determined according to applicable resources of the frequency domain resource attribute mode.

In an embodiment, the device also includes:

a configuration type determining module, configured to determine a configuration type of a resource attribute, where the resource attribute includes a frequency domain resource attribute and a time domain resource type; the configuration type of the resource attributes includes:

a first configuration type: configuring a time domain resource type of a time domain resource of each symbol direction in each slot; a second configuration type: configuring a frequency domain resource attribute of a time domain resource in each slot, or configuring a frequency domain resource attribute of a time domain resource of each symbol direction in each slot.

The resource attribute determining device provided by this embodiment and the resource attribute determining method provided by the above embodiments belong to the same concept, the technical details not described in detail in the embodiment may be found in any of the above embodiments, and this embodiment has the same effect as that of the resource attribute determining method.

Figure 5:
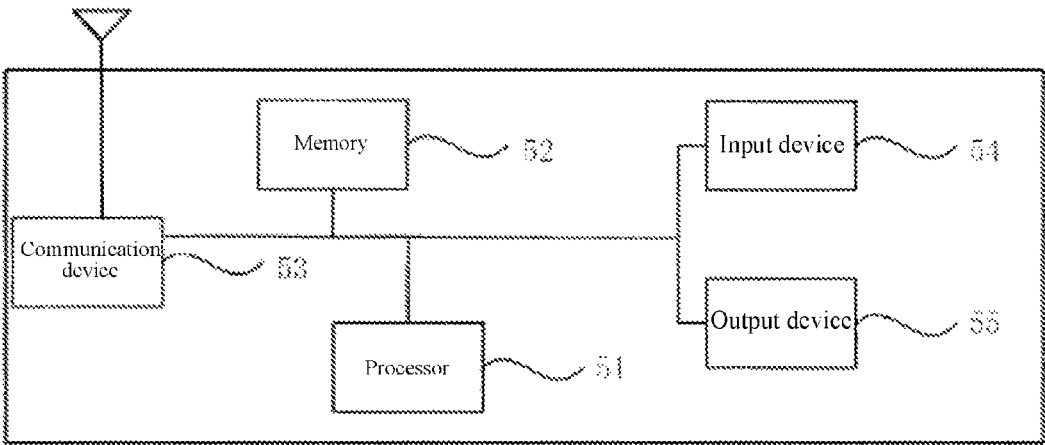
FIG. 5 is a structural schematic diagram of a hardware of a communication node provided by an embodiment.

The embodiments of the present disclosure also provide a communication node. FIG. 5 is a structural schematic diagram of a communication node provided by the present disclosure. As shown in FIG. 5, the communication node provided by the present disclosure includes a memory 52, a processor 51, and a computer program stored in the memory 52 and runnable on the processor 51, when the processor 51 executes the program the above resource attribute configuring method or the resource attribute determining method is implemented.

The processor 51 in the communication node may be one or more, one processor 51 is taken as an example in FIG. 5; the memory 52 is used for storing one or more programs; the one or more programs are executed by the one or more processors 51, so that the one or more processors 51 implement the resource attribute configuring method or the resource attribute determining method as described in the embodiments of the present disclosure.

The communication node also includes: a communication device 53, an input device 54, and an output device 55.

The processor 51, the memory 52, the communication device 53, the input device 54 and the output device 55 in the communication node may be connected by a bus or other ways, where the connection by the bus is taken as an example in FIG. 5.

The input device 54 may be used to receive input digital or character information, and generate a key signal input related to a user setting and a function control of the communication node. The output device 55 may include a display device such as a display screen.

The communication device 53 may include a receiver and a transmitter. The communication device 53 is configured to transmit and receive information according to the control of the processor 51.

The memory 52, as a computer readable storage medium, may be configured to store software programs, computer executable programs and modules, such as the program instructions/modules corresponding to the resource attribute configuring method described in the embodiment of The present disclosure (for example, the configuring module 310 and the transmitting module 320 in the resource attribute configuring device). The memory 52 may include a storage program area and a storage data area, where the storage program area may store an application program required by an operating system and at least one function; the storage data area may store data created according to the use of the communication node. In addition, memory 52 may include high speed random access memory, and may also include nonvolatile memory, for example, at least one disk storage device, flash memory device, or other nonvolatile solid-state storage devices. In some examples, memory 52 may include memories that are remotely set with respect to the processor 51, these remote memories may be connected to the communication node by the network. Examples of the above network include but are not limited to the Internet, enterprise intranet, local area network, mobile communication network and a combination thereof.

The embodiments of the present disclosure also provide a storage medium storing computer programs, which, when being executed by a processor, implement the resource attribute configuring method or resource attribute determining method described in any of the embodiments of the present disclosure.

The resource attribute configuring method includes:

configuring at least one frequency domain resource attribute mode; transmitting configuration information of the at least one frequency domain resource attribute mode, where the configuration information is used to indicate a frequency domain resource attribute of a target time domain resource, and the frequency domain resource attribute of the target time domain resource meets one of the at least one frequency domain resource attribute mode.

The resource attribute determining method includes:

receiving configuration information of at least one frequency domain resource attribute mode; determining frequency domain resource attribute of a target time domain resource according to the configuration information, where the target time domain resource corresponds to at least one frequency domain resource, the frequency domain resource attribute of the target time domain resource meets one of the at least one frequency domain resource attribute mode.

The computer storage medium of the embodiment of the present disclosure may adopt any combination of one or more computer readable media. The computer readable medium may be a computer readable signal medium or a computer readable storage medium. The computer readable storage medium may be, for example, but is not limited to: electrical, magnetic, optical, electromagnetic, infrared, or semiconductor system, device, or apparatus, or any combination of the above. Examples (a non-exhaustive list) of computer readable storage media include: an electrical connection with one or more wires, a portable computer disk, a hard disk, a random access memory (RAM), a read only memory (ROM), erasable programmable read only memory (EPROM), a flash memory, an optical fiber, a portable CD-ROM, an optical storage device, a magnetic storage device, or any suitable combination of the above. The computer readable storage medium may be any tangible medium containing or storing programs, the programs may be used by or in combination with an instruction execution system, a device, or an apparatus.

A computer readable signal medium may include a data signal that is propagated in a baseband or as a part of carrier waves, in which computer readable program codes are carried. Such propagated data signal may adopt many forms, including but not limited to: electromagnetic signal, optical signal or any suitable combination of the above. The computer readable signal medium may also be any computer readable medium other than the computer readable storage medium, the computer readable medium may transmit, propagate, or transfer programs for used by or in combination with the instruction execution system, device, or apparatus.

The program codes contained on the computer readable medium may be transferred with any suitable medium, including but not limited to: wireless, wire, optical cable, radio frequency (RF), etc., or any suitable combination of the above.

The computer program codes for performing operations of The present disclosure may be written in one or more program design languages or a combination thereof, the program design languages include an object-oriented program design language, such as Java, Smalltalk, C++, and also include a conventional procedural program design language, such as the "C" language or similar program design language. The program codes may be executed completely on a user computer, executed partially on a user computer, executed as a separate software package, executed partially on a user computer and partially on a remote computer, or executed completely on a remote computer or a server. In the case involving the remote computer, the remote computer may be connected to the user computer by any type of the network, including a local area network (LAN) or a wide area network (WAN), or may be connected to an external computer (for example, connected by the Internet with an Internet service provider).

The above is only an exemplary embodiment of the present disclosure.

Those skilled in the art should understand that the term "user terminal" covers any suitable type of the wireless user equipment, for example a mobile phone, a portable data processing device, a portable web browser or a vehicle-mounted mobile station.

In general, many embodiments of the present disclosure may be implemented in a hardware or a dedicated circuit, a software, a logic or any combination thereof. For example, some aspects may be implemented in a hardware, while others may be implemented in a firmware or a software that may be executed by a controller, a microprocessor or other computing device, although The present disclosure is not limited thereto.

The embodiment of the present disclosure may be implemented by a data processor of a mobile device executing computer program instructions, for example, in a processor entity, or by a hardware, or by a combination of a software and a hardware. The computer program instructions may be assembly instructions, instruction set architecture (ISA) instructions, machine instructions, machine related instructions, microcode, firmware instructions, status setting data, or source codes or object codes written in any combination of one or more programming languages.

The block diagram of any logic flow in the drawings of the present disclosure may represent program steps, or may represent interconnected logic circuits, modules and functions, or may represent a combination of program steps, and logic circuits, modules and functions. The computer programs may be stored in memory. The memory may have any type suitable for the local technical environment and may be implemented by using any suitable data storage technology, for example but not limited to the read-only memory (ROM), random access memory (RAM), optical memory device and system (digital video disc (DVD) or compact disk (CD)), etc. The computer readable medium may include a non-instantaneous storage medium. The data processor may be any type suitable for the local technical environment, for example but not limited to a general computer, dedicated computer, microprocessor, digital signal processing (DSP), application specific integrated circuit (ASIC), field program-mable gate arrays (FPGA) and processor based on multi-core processor architecture.

What is claimed is:

1. A resource attribute configuring method, performed by a central unit, comprising:
configuring at least one frequency domain resource attri-bute mode; and transmitting configuration information of the at least one frequency domain resource attribute mode to a distrib-ute unit, wherein the configuration information is used to indicate a frequency domain resource attribute of a target time domain resource, and the frequency domain resource attribute of the target time domain resource meet one of the at least one frequency domain resource attribute mode; wherein the at least one frequency domain resource attribute mode comprises cases that:

in a first slot set, a frequency domain resource attribute of a time domain resource with a specific time domain resource type within each indication slot are all hard, all soft, or all unavailable; and in a second slot set, a frequency domain resource attribute of a time domain resource with a specific time domain resource type within each indication slot is configured by a resource block set as hard, soft, or unavailable; wherein the first slot set and the second slot set are a slot set in a configuration period, respectively.

2. The method according to claim 1, wherein the at least one frequency domain resource attribute mode comprises a first frequency domain resource attribute mode, configura-tion information of the first frequency domain resource attribute mode comprises at least one of:

a first resource block set of which a frequency domain resource attribute is hard, and location information of X resource blocks corresponding to the first resource block set;

a second resource block set of which a frequency domain resource attribute is soft, and location information of Y resource blocks corresponding to the second resource block set; and a third resource block set of which a frequency domain resource attribute is unavailable, and location informa-tion of Z resource blocks corresponding to the first resource block set;

wherein X is an integer greater than or equal to 0, Y is an integer greater than or equal to 0, and Z is an integer greater than or equal to 0.

3. The method according to claim 1, wherein there is at least one resource block set in a target carrier or a target cell, and each resource block set of the at least one resource block set consists of resource blocks at specified locations;

the at least one frequency domain resource attribute mode comprises a second frequency domain resource attri-bute mode, and configuration information of the second frequency domain resource attribute mode comprises at least one of:

at least one resource block set of which a frequency domain resource attribute is hard;

at least one resource block set of which a frequency domain resource attribute is soft; and at least one resource block set of which a frequency domain resource attribute is unavailable.

4. The method according to claim 1, wherein a frequency domain resource of which a frequency domain resource attribute is not indicated is a default attribute, the default attribute is hard, soft, or unavailable; or an attribute of the frequency domain resource of which the frequency domain resource attribute is not indicated is a indicated time domain resource attribute, and the time domain resource attribute is hard, soft or unavail-able.

5. The method according to claim 1, wherein the at least one frequency domain resource attribute mode comprises a third frequency domain resource attribute mode, configuration information of the third frequency domain resource attribute mode comprises location information of resource blocks in at least one resource block set, and a frequency domain resource attribute of each resource block set of the at least one resource block set.

6. The method according to claim 1, wherein there is at least one resource block set within a target carrier or a target cell, each resource block set of the at least one resource block set consists of resource blocks at specified locations;
the at least one frequency domain resource attribute mode comprises a fourth frequency domain resource attribute mode, and configuration information of the fourth frequency domain resource attribute mode comprises a frequency domain resource attribute of the at least one resource block set.

7. The method according to claim 1, wherein each frequency domain resource attribute mode of the at least one frequency domain resource attribute mode corresponds to an index number;
the index number of each frequency domain resource attribute mode is indicated by signaling, or determined according to location of the each frequency domain resource attribute mode in a frequency domain resource attribute mode list.

8. The method according to claim 1, wherein there are at least $q^p$ or $r*q^p$ frequency domain resource attribute modes, wherein p is a number of resource block sets within a target carrier or a target cell, q is a number of types of the frequency domain resource attributes, r is a number of time domain resource types;
wherein the frequency domain resource attribute comprises at least one of hard, soft and unavailable;
the time domain resource type comprises at least one of uplink, downlink or flexible.

9. The method according to claim 1, wherein the at least one frequency domain resource attribute mode further comprises cases that:
in an indication slot, there is a frequency domain resource attribute of a time domain resource with at least one time domain resource type, where the frequency domain resource attribute is one of: hard, soft, and unavailable; or
in an indication slot, there is a frequency domain resource attribute of a time domain resource with at least one time domain resource type, where the frequency domain resource attribute comprises at least two of hard, soft and unavailable.

10. The method according to claim 1, wherein the at least one frequency domain resource attribute mode further comprises at least one of cases that:
in an indication slot, there is a frequency domain resource attribute of a time domain resource with at least one time domain resource type being a first type of attribute, wherein the first type of attribute is hard, soft or unavailable; and
in an indication slot, there is a frequency domain resource attribute of a time domain resource with at least one time domain resource type being a second type of attribute, wherein the second type of attribute comprises at least two of hard, soft and unavailable.

11. The method according to claim 1, wherein the at least one frequency domain resource attribute mode further comprises at least one of cases that:

in an indication slot, a frequency domain resource attribute of a time domain resource of which a time domain resource type is uplink, is a first type of attribute or a second type of attribute;
in an indication slot, a frequency domain resource attribute of a time domain resource of which a time domain resource type is downlink, is a first type of attribute or a second type of attribute; and
in an indication slot, a frequency domain resource attribute of a time domain resource of which a time domain resource type is flexible, is a first type of attribute or a second type of attribute;
wherein the first type of attribute is hard, soft or unavailable;
the second type of attribute comprises at least two of hard, soft and unavailable.

12. The method according to claim 11, further comprising:
determining a configuration type of a resource attribute, wherein the resource attribute comprises a frequency domain resource attribute and a time domain resource type;
the configuration type of the resource attribute comprises:
a first configuration type: configuring a time domain resource type of a time domain resource of each symbol direction in each slot; and
a second configuration type: configuring a frequency domain resource attribute of a time domain resource in each slot, or configuring a frequency domain resource attribute of a time domain resource of each symbol direction in each slot.

13. The method according to claim 1, wherein the at least one frequency domain resource attribute mode further comprises at least one of cases that:
in an indication slot, a frequency domain resource attribute of a time domain resource of which a time domain resource type is uplink comprises at least two of hard, soft and unavailable;
in an indication slot, a frequency domain resource attribute of a time domain resource of which a time domain resource type is downlink comprises at least two of hard, soft and unavailable; and
in an indication slot, a frequency domain resource attribute of a time domain resource of which a time domain resource type is flexible comprises at least two of hard, soft and unavailable; wherein
the frequency domain resource attribute of the target time domain resource is determined, according to an indication slot where the target time domain resource is located, and a time domain resource type of the target time domain resource.

14. The method according to claim 1, wherein the at least one frequency domain resource attribute mode further comprises a case that:
in an indication slot, there is a frequency domain resource attribute of a time domain resource with at least one time domain resource type being a first type of attribute, where the first type of attribute is hard, soft or unavailable; or, a frequency domain resource attribute of time domain resource in the indication slot is a second type of attribute, where the second type of attribute comprises at least two of hard, soft and unavailable;
wherein the frequency domain resource attribute of the target time domain resource is determined according to an indication slot where the target time domain resource is located, and a time domain resource type of the target time domain resource; or, the frequency domain resource attribute of the target time domain resource is determined according to an indication slot where the target time domain resource is located.

15. The method according to claim 1, wherein the at least one frequency domain resource attribute mode further comprises cases that:

a frequency domain resource attribute of a time domain resource in each indication slot comprises at least two of hard, soft and unavailable, wherein a frequency domain resource attribute of a target time domain resource is determined according to an indication slot which the target time domain resource is located; or there is a frequency domain resource attribute of a time domain resource with at least one time domain resource type comprising at least two of hard, soft and unavailable in the configuration period, wherein the configuration period comprises at least one slot, wherein the frequency domain resource attribute of the target time domain resource is determined according to a configuration period where the target time domain resource is located and a time domain resource type of the target time domain resource.

16. The method according to claim 1, wherein the at least one frequency domain resource attribute mode further comprises at least one of:

a fifth frequency domain resource attribute mode, wherein configuration information of the fifth frequency domain resource attribute mode comprises: a time domain resource applicable to the fifth frequency domain resource attribute mode, and at least one of slot sets applicable to the fifth frequency domain resource attribute mode;

a sixth frequency domain resource attribute mode, wherein configuration information of the sixth frequency domain resource attribute mode comprises: a time domain resource with a specified time domain resource type on a group of slots applicable to the sixth frequency domain resource attribute mode; and a seventh frequency domain resource attribute mode, wherein configuration information of the seventh frequency domain resource attribute mode comprises: a resource with a specified time domain resource type applicable to the seventh frequency domain resource attribute mode;

wherein the frequency domain resource attribute of the target time domain resource is determined according to an applicable resource of the frequency domain resource attribute mode.

17. A non-transitory computer readable storage medium storing a computer program, wherein the program, upon being executed by a processor, implements the resource attribute configuring method of claim 1.

18. The method according to claim 1, wherein in a second slot set, the frequency domain resource attribute of the time domain resource with the specific time domain resource type within each indication slot is configured by a resource block set as hard, soft, or unavailable, comprises:

in an indication slot, a frequency domain resource attribute of a time domain resource of which a time domain resource type is uplink is configured by a plurality of resource block sets;

in an indication slot, a frequency domain resource attribute of a time domain resource of which a time domain resource type is downlink is configured by a plurality of resource block sets; and in an indication slot, a frequency domain resource attribute of a time domain resource of which a time domain resource type is flexible is configured by a plurality of resource block sets;

wherein a frequency domain resource attribute of a specific time domain resource is configured by different resource block sets comprises:

defining the plurality of resource block sets; each resource block set includes a group of resource blocks;

a frequency domain resource attribute of each resource block set being configured to be hard, soft or unavailable, wherein frequency domain resource attributes of the plurality of resource block sets comprises at least two of hard, soft and unavailable.

19. A resource attribute determining method, performed by a distribute unit, comprising:

receiving configuration information of at least one frequency domain resource attribute mode from a central unit; and determining a frequency domain resource attribute of a target time domain resource according to the configuration information, wherein the target time domain resource corresponds to at least one frequency domain resource, and the frequency domain resource attribute of the target time domain resource meets one of the at least one frequency domain resource attribute mode; wherein the at least one frequency domain resource attribute mode comprises cases that:

in a first slot set, a frequency domain resource attribute of a time domain resource with a specific time domain resource type within each indication slot are all hard, all soft, or all unavailable; and in a second slot set, a frequency domain resource attribute of a time domain resource with a specific time domain resource type within each indication slot is configured by a resource block set as hard, soft, or unavailable; wherein the first slot set and the second slot set are a slot set in a configuration period, respectively.

20. A communication node, comprising a memory, a processor, and a computer program storing on the memory and runnable on the processor, wherein the processor executes the program to:

configure at least one frequency domain resource attribute mode; and transmit configuration information of the at least one frequency domain resource attribute mode, wherein the configuration information is used to indicate a frequency domain resource attribute of a target time domain resource, and the frequency domain resource attribute of the target time domain resource meet one of the at least one frequency domain resource attribute mode; wherein the at least one frequency domain resource attribute mode comprises cases that:

in a first slot set, a frequency domain resource attribute of a time domain resource with a specific time domain resource type within each indication slot are all hard, all soft, or all unavailable; and in a second slot set, a frequency domain resource attribute of a time domain resource with a specific time domain resource type within each indication slot is configured by a resource block set as hard, soft, or unavailable; wherein the first slot set and the second slot set are a slot set in a configuration period, respectively.

\* \* \* \* \*